(12) United States Patent
Lanng

(10) Patent No.: US 8,600,859 B2
(45) Date of Patent: Dec. 3, 2013

(54) AUTOMATIC TRADING SYSTEM WITH COMPUTER AIDED DECISION-METHODS OF WHEN TO BUY AND SELL ON STOCK EXCHANGES

(76) Inventor: Soren Lanng, Hellerup (DK)

(*) Notice: Subject to any disclaimer, the term of this patent is extended or adjusted under 35 U.S.C. 154(b) by 408 days.

(21) Appl. No.: 12/665,087

(22) PCT Filed: Jun. 18, 2008

(86) PCT No.: PCT/DK2008/000225
§ 371 (c)(1),
(2), (4) Date: Dec. 17, 2009

(87) PCT Pub. No.: WO2009/000264
PCT Pub. Date: Dec. 31, 2008

(65) Prior Publication Data
US 2010/0174665 A1 Jul. 8, 2010

(30) Foreign Application Priority Data

| | | |
|---|---|---|
| Jun. 24, 2007 | (DK) | 2007 00907 |
| Jul. 9, 2007 | (DK) | 2007 01013 |
| Sep. 11, 2007 | (DK) | 2007 01315 |
| Sep. 14, 2007 | (DK) | 2007 01328 |
| Jun. 16, 2008 | (DK) | 2008 00839 |

(51) Int. Cl.
*G06Q 40/00* (2012.01)
(52) U.S. Cl.
USPC .................. 705/36 R; 705/35; 705/37
(58) Field of Classification Search
USPC ................... 705/35, 36 R, 37
See application file for complete search history.

(56) References Cited

U.S. PATENT DOCUMENTS

| | | | |
|---|---|---|---|
| 2001/0032144 A1* | 10/2001 | Magid | 705/26 |
| 2002/0040336 A1* | 4/2002 | Blanchard et al. | 705/36 |
| 2002/0052820 A1* | 5/2002 | Gatto | 705/36 |
| 2002/0073017 A1* | 6/2002 | Robertson | 705/37 |
| 2003/0097325 A1* | 5/2003 | Friesen et al. | 705/37 |
| 2003/0139989 A1* | 7/2003 | Churquina | 705/35 |
| 2003/0172021 A1* | 9/2003 | Huang | 705/36 |
| 2004/0030623 A1* | 2/2004 | Long | 705/35 |
| 2005/0075966 A1* | 4/2005 | Duka | 705/37 |
| 2005/0228735 A1* | 10/2005 | Duquette | 705/37 |
| 2006/0069635 A1* | 3/2006 | Ram et al. | 705/37 |
| 2006/0100953 A1* | 5/2006 | Downs, II | 705/37 |

(Continued)

OTHER PUBLICATIONS

Prop Trader,"Prop Trader Version 2.8 User Guide," Jun. 8, 2001, pp. 1-106.*

(Continued)

*Primary Examiner* — Kenneth Bartley
(74) *Attorney, Agent, or Firm* — Soren Lanng

(57) ABSTRACT

A computerized trading system for trading a tradable product at stock exchanges where a user can define a number of criteria to be met in order for the system to allow/indicate a trade order of a selected Symbol or allow/indicate a pair trade of two selected Symbols. A method to format a data stream providing a novel result used for the calculation of technical indicators and the derived criteria and/or used for visual presentation of price movements of the tradable product in the computerized trading system by determining the time to close a bar. Product data having product prices is received at different times by the computer system, and the computer system for each closed bar has corresponding bar data buffers with data representing time of close of bar and last received product price at close of bar.

20 Claims, 22 Drawing Sheets

(56) References Cited

U.S. PATENT DOCUMENTS

| | | |
|---|---|---|
| 2006/0212376 A1* | 9/2006 | Snyder et al. .................. 705/35 |
| 2006/0235786 A1* | 10/2006 | DiSalvo ......................... 705/37 |
| 2007/0016502 A1* | 1/2007 | Williamson et al. ............ 705/35 |
| 2008/0027880 A1* | 1/2008 | Yu ................................. 705/36 R |
| 2008/0243711 A1* | 10/2008 | Aymeloglu et al. ......... 705/36 R |

OTHER PUBLICATIONS

Access, "Access Advanced Queries," Oct. 7, 2003, Computing Services Queen Mary, University of London, p. 1-15.*

* cited by examiner

PAGE 1 (New Trade)    PAGE 2 (New Trade)    PAGE 5 (Cover)

Fig. 28

PAGE 1 (New Trade)    PAGE 2 (New Trade)    PAGE 3 (New Trade)

PAGE 5 (Cover)    PAGE 6 (Cover)    PAGE 7 (Cover)

AUTOMATIC TRADING SYSTEM WITH COMPUTER AIDED DECISION-METHODS OF WHEN TO BUY AND SELL ON STOCK EXCHANGES

CROSS-REFERENCE TO RELATED APPLICATIONS

This application is an U.S. national phase application under 35 U.S.C. §371 based upon co-pending International Application No. PCT/DK2008/000225 filed on Jun. 18, 2008. Additionally, this U.S. national phase application claims the benefit of priority of co-pending International Application No. PCT/DK2008/000225 filed on Jun. 18, 2008, Denmark Application No. PA2007 00907 filed on Jun. 24, 2007, Denmark Application No. PA2007 01013 filed on Jul. 9, 2007, Denmark Application No. PA2007 01315 filed on Sep. 11, 2007, Denmark Application No. PA2007 01328 filed on Sep. 14, 2007, and Denmark Application No. PA2008 00839 filed on Jun. 16, 2008. The entire disclosures of the prior applications are incorporated herein by reference. The international application was published on Dec. 31, 2008 under Publication No. WO 2009/000264.

BACKGROUND OF THE INVENTION

1. Field of the Invention

The present invention relates to an automatic trading system with computer aided decision-methods of when to buy and sell on stock exchanges for use in connection with deciding when to buy and sell a trading product.

2. Description of the Prior Art

The decision of when to buy and sell is an essential issue when trading on stock exchanges.

Still the decision of when to buy and sell stocks, futures, options, bonds warrants, currencies and similar traded products on stock exchanges, hereinafter called a "Symbol", using automatic trading systems, and charting systems with limited or no functionality of automated trading, hereinafter called a "ATS", is mainly based on the traders interpretation of a visual presentation of a Symbols price movements using bars and technical indicators, often combined with fundamental information and market news. For the technical analysis of a Symbol, the patterns of the bars together with the patterns of the technical indicators, are the fundamental sources and inputs for the decision making of when to buy and sell. The time when a bar is closed/ended, determines the visual presentation of the bar, its significance and value in combination with the former bars, but also determines the following calculation of the technical indicators. The methods of deciding when a bar should be ended/terminated has till today been divided into two main methods with the resulting two bar types; timebars and rangebars (including volumebars). Both bar types have advantages and disadvantages. Timebars with the disadvantage that fast price movements are not cached till after the fixed time-period of the bar has terminated, which moment often will be too late to react. Rangebars, including both price and volume rangebars, with the disadvantage that horizontal price/volume movements are not captured, thus sideways trading or important support or resistance levels may not be detected by this bar type. Especially automatic trading systems are vulnerable to the disadvantages of timebars and rangebars, as an automatic trading system primarily acts at the close of a new bar, used in calculating of the technical indicators, used as input to the Personal Indicator which decides whether to buy or sell.

The trader's ability to select the optimal bar configuration, the timeframe, the optimal set of indicators, and the optimal settings for each indicator, and finally his interpretation of the behavior of this mix of inputs, determines his success in trading Symbols on the stock exchanges. An ATS may have one or more functionalities which decides or suggests when to buy and sell. One type of decision may be by combining a mix of available criteria into—a Personal Algorithm, which the ATS can use as input for when to buy and sell. Probably the most simple criteria may be if a Symbols price exceeds a fixed price, this criteria has been used in decades by trading systems for STOP LOSS automatically closing a position, very visible on stock market when thousands of systems hits a specific price or price area, and when ATS automatically closes the position. Most commonly such criteria are written by using a programming language and included in the ATS. Various ATS systems have tried to provide the user with a form of GUI in the process of developing and combining such a mix of criteria into an algorithm. However they all involve programming or simple dropdown lists of strategies or criteria, these methods are weak with the respect to, that a useful OR functionality is difficult to obtain, and multi timeframe or multi symbol algorithms are difficult to develop. A set of criteria for both buying and selling doubles the amount of criteria visible to the user. Using a programming language in the development of algorithms and strategies requires that the user has programming skills. Further the need of validating, compiling and debugging the code written, slows down the development process significantly. In case of more than one Symbol, chart or time frames are used in the combining of a mix of criteria, this task is even more difficult and complex to perform. In the process of combining a set of criteria into a Personal Indicator, the back testing of this Personal Indicator on historical data, and finally testing this Personal Indicator on a Paper Account, the user may have to back test 1,000's of combinations till he finally finds a combination which is profitable. If all combinations have to be programmed, debugged and compiled, this process may exceed the time available for the developer to spend in the effort to develop and test algorithms and strategies. Many users of present ATS systems lose interest and patience after a few hours or days of process. The missing availability of a method to develop and combine a Personal Indicator fast yet complex, by using acid a non-programming method, limits the use of ATS systems to traders with programming skills, often limits the algorithms to simple algorithms, and requires an effort time-wise that few developers can spare. Further, in today's market influenced by automated trading, the way the market behavior changes with an increasing speed, traditional development methods will be too slow to follow the changes in the market behavior. Further, the increasing competition from ATS systems requires more sophisticated and complex algorithms in order to compete, thus the traditional programming of algorithms may be too slow and simple to compete in the future market. Trading on the stock market is not an easy task, especially if the trader has to follow the market tick by tick 8 hours a day. During the latest years, new tools such as automatic and semi automatic trading systems have entered the market in order to help the trader in following the market during the day, or even run unattended using a Personal Indicator as decision of when to buy and sell. Less experienced traders consult Mentor Rooms, where experienced traders follow the market during the day, advising the subscribing traders of when to buy and sell. Usually this is performed in a chat forum where the calls are written or/and announced orally, or in some cases also visually presented on charts in the Mentor Room. The trader then manually enters the order on his trading platform upon trading calls from the Mentor Room.

This service demands that the trader follows the Mentor, listen, read and understand all the messages in order to execute the suggested trades correctly. This may cause misunderstandings by the user, missing important trades or even executing wrong trades or mistyping the order. Once a trade has been opened, the trader is forced to stay at the computer to follow the trade, and may be too impatient exiting a trade too early, or may be greedy exiting the trade too late.

SUMMARY OF THE INVENTION

It is therefore the intention of this invention to solve some of the major problems users of automatic trading systems, and charting systems with limited or no automatic trading capability, face today, by the use of computer aided methods providing new methods in the decision of when to buy or sell a Symbol more precise, more fast, versatile and profitable. This invention uses the following new methods:

A new bar type, called a combined bar, used as source for the calculation of technical indicators and criteria to be used by the ATS in the decision of when to buy and sell, eliminating the disadvantages of timebars and rangebars, providing additional and new information to the bar chart and bar-value, and very importantly providing new and more informative input to the calculation of technical indicators, which affects the input to the decision of when to buy and sell a Symbol.

A new computer aided development method using a multidimensional Criteria Grid, using an inverting and a paging method in the users task of developing and combining the mix of criteria of when to buy and sell into a complex algorithm—the Personal Indicator, replacing the programming of the algorithms with a non-programming method. The invention solves major problems in how to develop and back test algorithms, including the OR functionality, portfolio trading of independent algorithms, loop test and optimizing of combinations of criteria, pair trading and makes partial profit taking possible in an operational manner.

A new computer aided method to automatically or semi-automatically trade the suggestions from Mentor and external sources. Mentors trade calls are used as an additional input to the ATS decision making of when to buy and sell, providing the trader with a more secure and fast method to follow and execute a Mentor's suggestions of when to buy and sell, even providing automatic or semi automatic execution of the Mentor's trade calls.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 16 is an example of an overall functionality of Criteria Grid and Criteria Page;

FIG. 27 is an example of Criteria Pages showing how the invention may be used for pair trading; and FIG. 28 is an example of Criteria Pages showing how the invention may be used for portfolio trading.

DESCRIPTION OF THE PREFERRED EMBODIMENT

Figure 1:
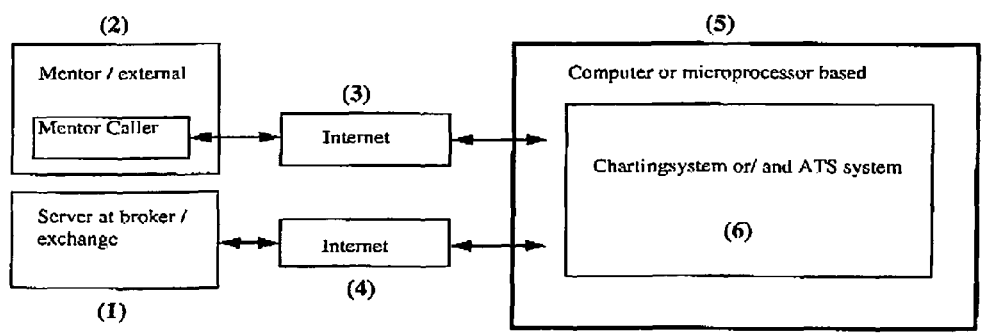
FIG. 1 is a block diagram of the computerized system of the present invention.

FIG. 1 shows an example of an automatic trading system, which also may be a charting system with limited or no automatic trading capabilities. The system connects to a server (1) which may be the stockbroker's server, or may be a server on the stock exchange. The connection may be established by the internet (4). The automatic trading system may consist of a computer (5) which may have a monitor, keyboard and mouse attached, or may be a microprocessor based platform. The graphic user interface (6) may both contain the user interface itself, and may contain functionality to perform decisions without the interference of the user, or may be with limited or without user interference. The automatic trading system may also communicate with other external units, in FIG. 1 shown as communication with a Mentor Room (2), the connection may be established by the internet (3). The sources of information (1) and (2) may provide the automatic trading system with information such as price, volume, market news, suggestions of when to buy or sell, or other relevant information for a automatic trading system. Some stockbrokers provide an application for users of ATS, running on the user's platform with a host socket for the ATS, and a client socket for connection to the Server (1), acting as a link between the ATS and the Server (1).

Figure 2:
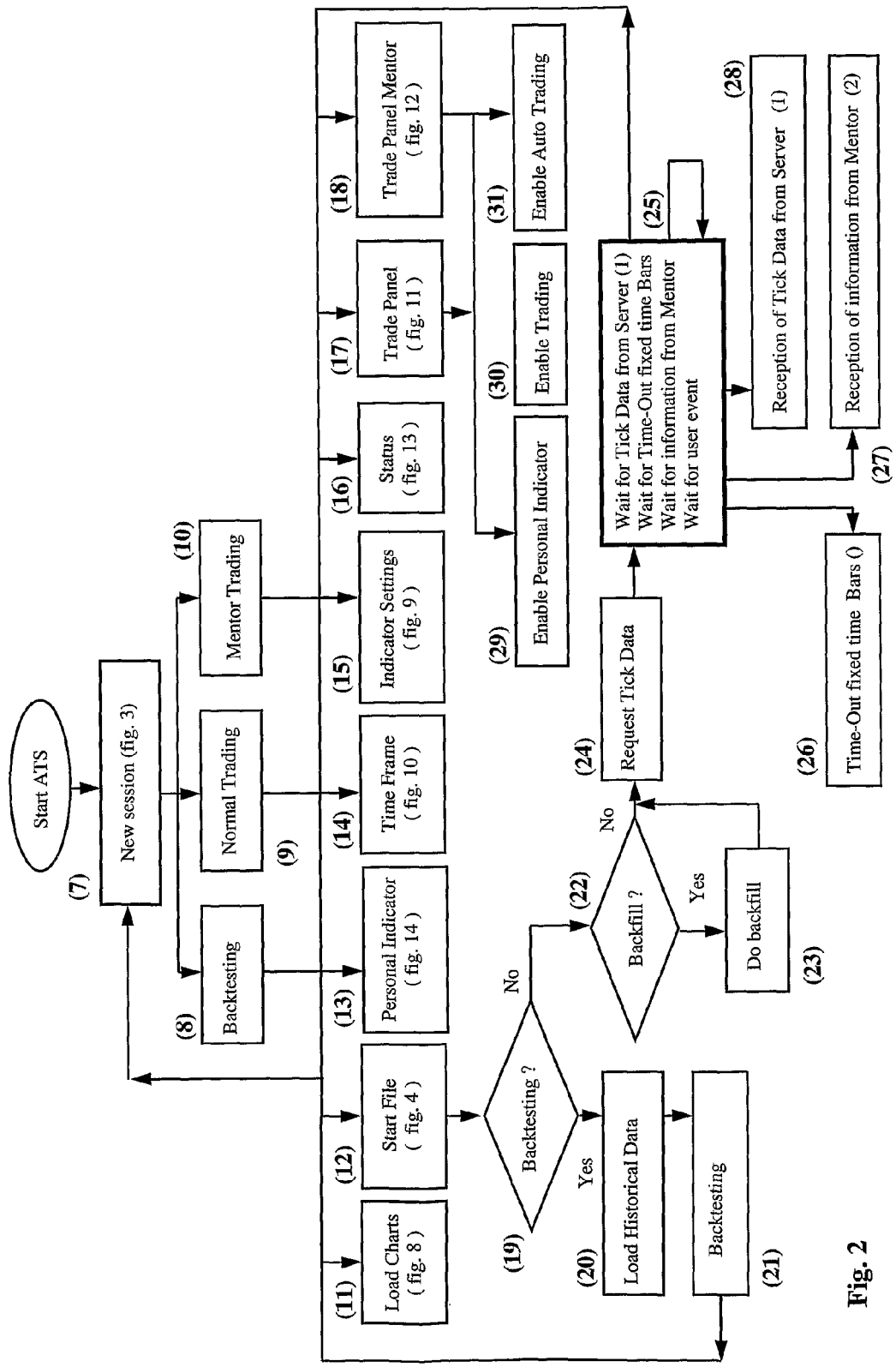
FIG. 2 is a block diagram of the ATS.

FIG. 2 shows a flow diagram of how an automatic trading system or charting system with no or limited automated trading capability may be described and understood. The user may start a new session by entering (7).

Figure 3:
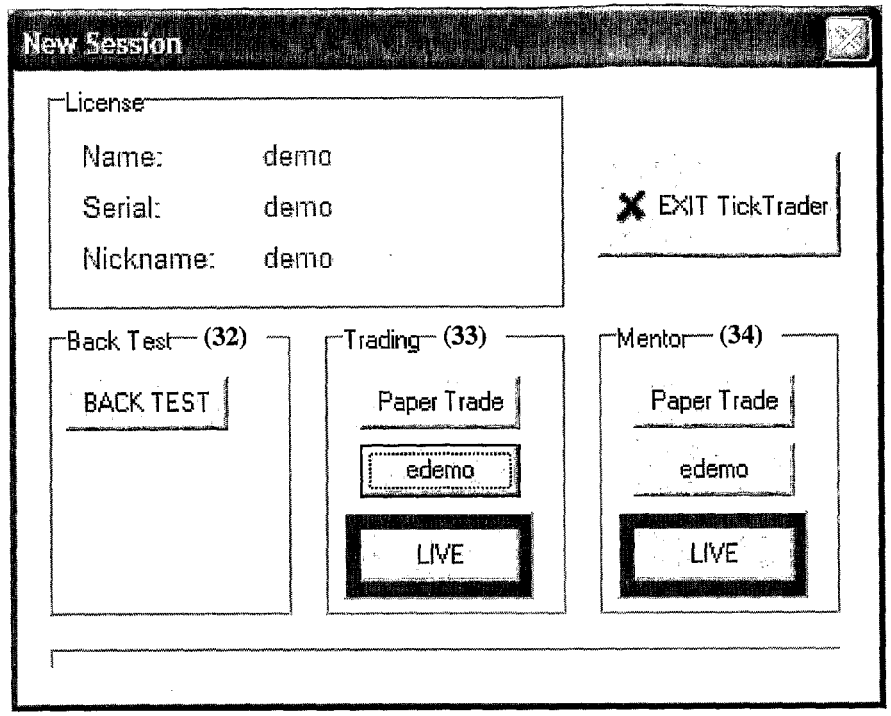
FIG. 3 is an example of how a session type in an ATS can be selected.

FIG. 3. Different session types may be used, so the user can be sure he is not trading by a mistake. FIG. 3 shows an example using three session types, "Back test" (32), "Trading" (33) and "Mentor" (34). In case Back test is selected, the user may only back test, and any kind of trading is not allowed. In case of Trading the user has no access to back testing and may only Trade. Selecting Mentor, the user may only trade on calls from a Mentor Room, and may not back test or trade using a Personal Indicator.

Figure 4:
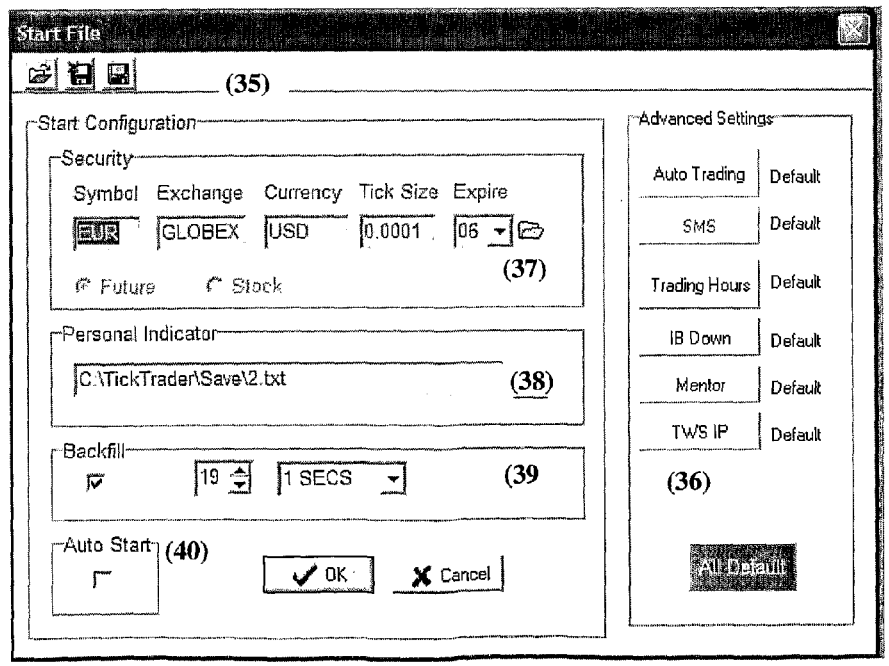
FIG. 4 is an example of how a menu for system options in an ATS may be designed.

FIG. 4. Common for all three session modes shown, may be a "Start File" method, which may be used to configure the session (35). The Symbols to use may be selected in (37). The Personal Indicator file to use may be selected in (38). Backfill information may be selected in (39). The Start File configuration set in FIG. 4 may be saved to a file for later use or for next boot of the ATS. Each time Start File Window is activated, values in the last saved file may be loaded into the Start File Window. Check box (40) selects whether the next session selected in FIG. 3 will bypass the Start File Window and continue, using values from the latest saved file.

A range of optional "Advanced Settings" may be included in the Start File Window (36). Such Advanced settings may be as shown in FIGS. 5-7.

Figure 5:
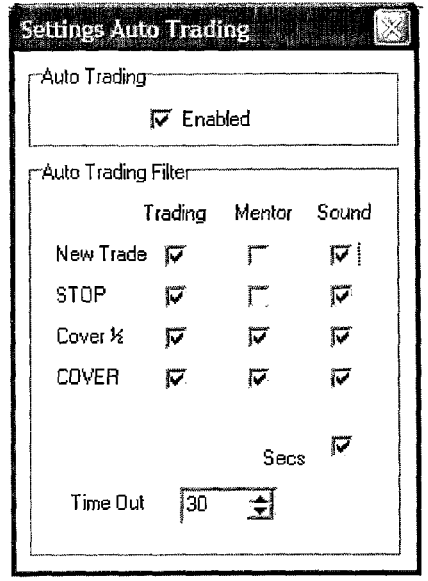
FIG. 5 is an example of how trading options may be selected in an ATS.

FIG. 5 shows a method to configure an Auto Trade filter of when a trade may be executed automatically without interference from the user. Separate settings for Trading and Mentor Trading may be used. Time-out value for a timer function used in semi-automatic trading may be set here.

Figure 6:
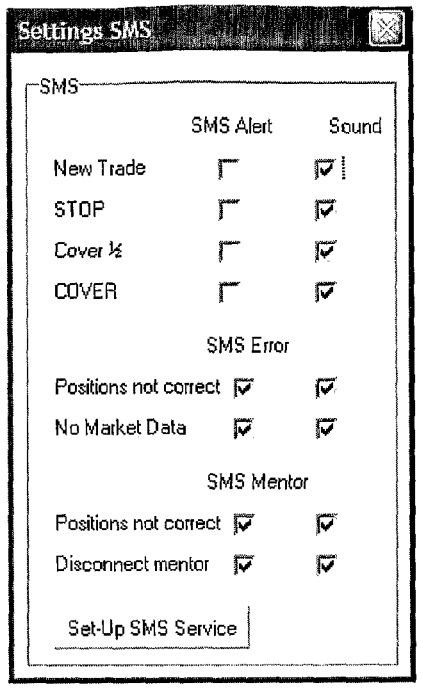
FIG. 6 is an example of how SMS messaging may be configured in an ATS.

FIG. 6 shows a method of the configuration of a SMS filter of when a SMS message may be sent to the users mobile phone, including both settings for Trading session and Mentor Trading session. A SMS message may be sent to the user on events such as; new trades, cover, stop, on disconnect from Mentor Room, when no market data available from (1), if positions locally does not correspond with the Server (1) position.

Figure 7:
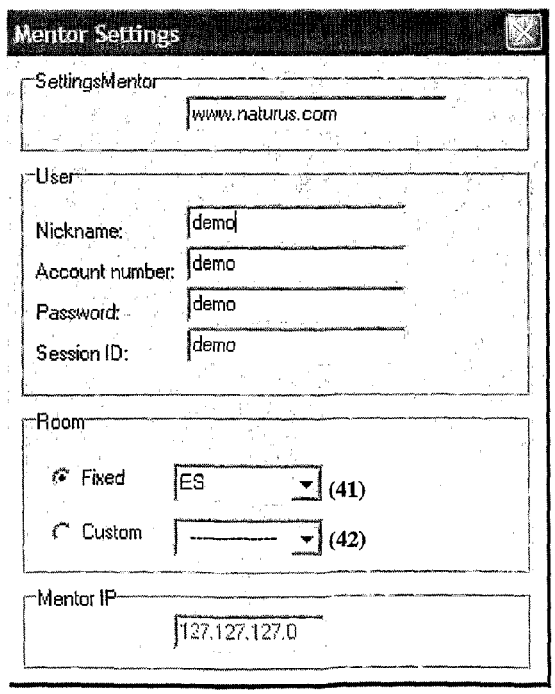
FIG. 7 is an example of how a Mentor Room may be configured in an ATS 520 8. Example, of an ATS with charting capability.

FIG. 7 shows an example of how the user may configure the Mentor Room settings, including selection of which Symbol to trade at Mentor. In case the Mentor provides multiple Symbols to trade, the desired Symbol to trade may be selected from a list (41), and setting of the Mentor Room servers IP address corresponding to this Symbol in case each Symbol to trade has a separate IP address (42).

Other Advanced Settings may be used, such as a filter of which days and hours during the day the ATS may trade, at which hours Server (1) is down for maintenance, at which days or hours particular stock exchanges are closed. An advanced setting may also include which data provider to use for data feed, and which stockbroker to use for trading, in case several providers are available.

The Start File may load a number of charts, which may be the visual presentation of the underlying data buffers containing information on bars in all time frames, technical indicators, and other chart related information.

Figure 8:
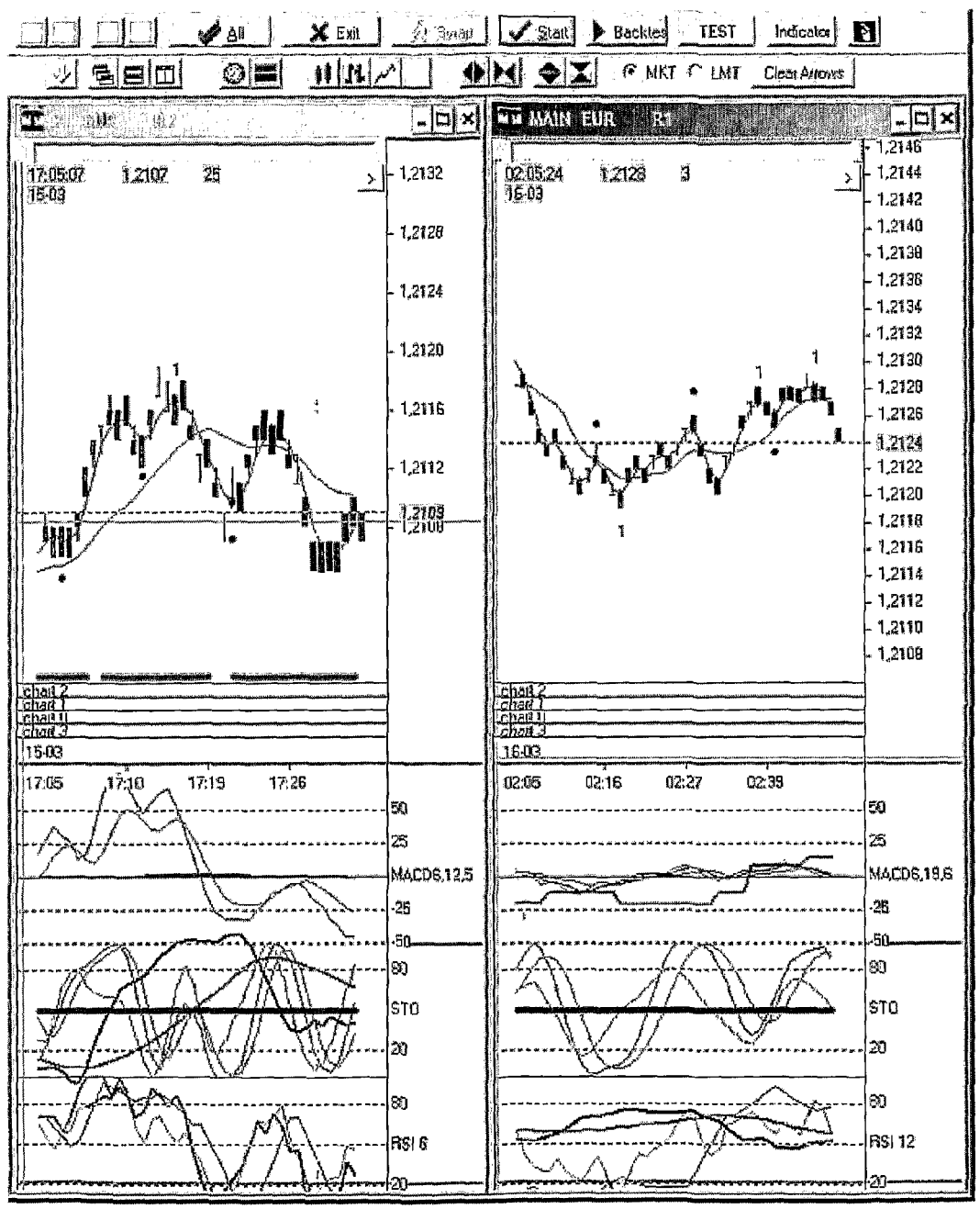
FIG. 8 is an example of an ATS with charting capability.

FIG. 8 shows an example of how price movements of the Symbol visually may be presented to the user on one or several charts, in this example FIG. 8 two charts are visualized. On the chart window, functionalities such as re-sizing the bar widths, heights and spacing, bar style and other common functionalities for charting systems may be included. Technical indicators may be drawn at the charts. The ATS may use only one Symbol, and a set of charts representing the underlying data for this one symbol, but in different time frames. The ATS may use the tick data from several Symbols, but only trade one particular Symbol.

Figures 9, 10:
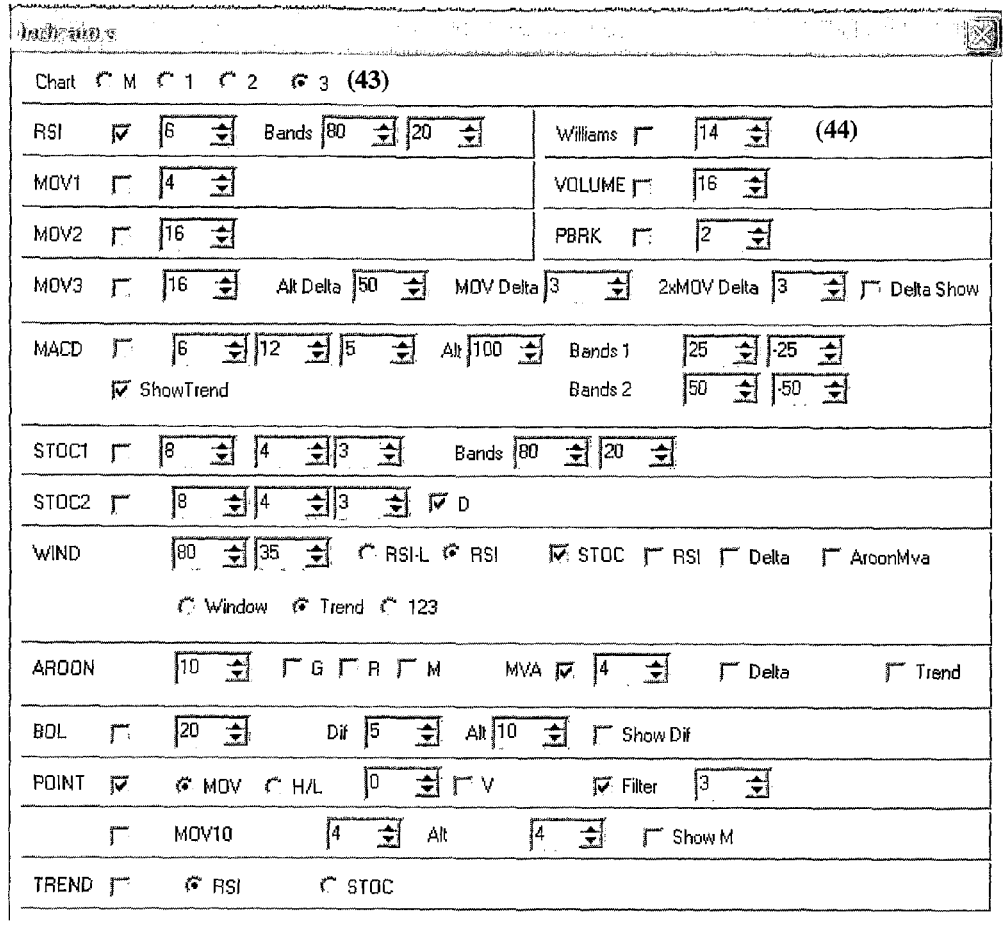
FIG. 9 is an example of how technical indicators may be configured in an ATS.
FIG. 10 is an example of how timeframes may be configured in an ATS 10a,b,c. Example, of time bars, range bars and combined bars.

FIG. 9 shows how a method to change the parameters (44) of the Technical Indicators may be. Settings for technical indicators may be set individually for each chart. When the user changes a setting of an indicator, an underlying data buffer may be updated. A paging panel may be used to quickly switch the chart to edit (43). FIG. 9 shows an example using 4 charts; chart M, chart 1, chart 2 and chart 3. Each time the user change the chart to work with and edit, FIG. 9 may be updated with the corresponding values from the underlying data buffers.

FIG. 10 shows a method of how the user may set the Time Frame values of a specific chart and the underlying data buffers. The chart is selected by selecting/activating the chart. An array of buttons (45) may be used to select which bar type and value to use in the selected chart. If a button with the first letter R for Range is selected, Rangebars with the fixed value of the number following R is used. If a button starting with the letter M is selected, bars with fixed time in seconds is used. If a button starting with the letter D is selected, bars with fixed time in days is used. If a button with the letter W is selected, bars with fixed time in weeks is used. If a button with the letter M is selected, bars with fixed time in months is used. A new bar type, which we may call a "Combined Bar", may be selected by checking check box (47). In case check box (47) is checked, both (45) and an additional group of buttons (46) may be used to set the parameters for the combined bar. (45) is used to select the fixed time, and (46) is used to select the fixed range.

Combined Bars

Figure 10A:
FIG. 10a is an example of a chart based on Minute Bars.
Figure 10B:
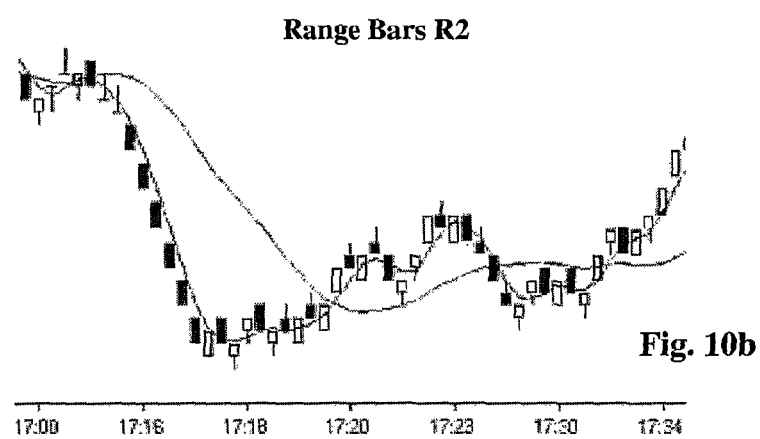
FIG. 10b is an example of a chart based on Range bars.
Figure 10C:
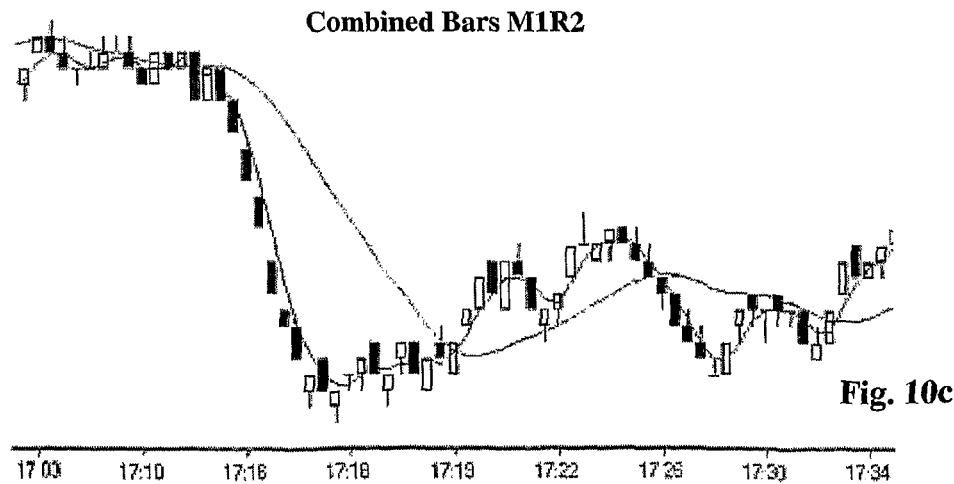
FIG. 10c is an example of a chart based on Combined Bars.

FIG. 10*a*, 10*b*, 10*c* illustrates the differences between the two conventional bar types, timebars and rangebars, compared with the advantages of the combined bar method. FIG. 10*a* show an example of a fixed time chart, at 1 minute chart. In the time period 17:00 to 17:14 the price is sideways moving with approximately 14 bars to represent this sideways price movement. The steep drop in price at 17:15 is shown as a long solid bar, and provides no further information of the price movement in this short time period. When this long bar is ended and drawn, the price has already bottomed and a signal on this bar may be too late.

FIG. 10*b* shows the same time period as in FIG. 10*a*, but using range bars R2 to represent the price movements. In the time period 17:00 to 17:14 only 6 bars represent the sideways situation and does not catch that the market is trading sideways. The single long solid bar at 17:15 in FIG. 10*a* is here represented by 5 range bars.

FIG. 10*c* shows the same time period as in FIG. 10*a*, but using combined bars. The combined bar catch both the sideways price movement in the period 17:00 to 17:14, and the steep drop at 17:15. The combined bars chart provide more bars to represent the price movement, which is noticeable by the time line is much longer than in FIG. 10*a* and FIG. 10*b*.

Figure 11:
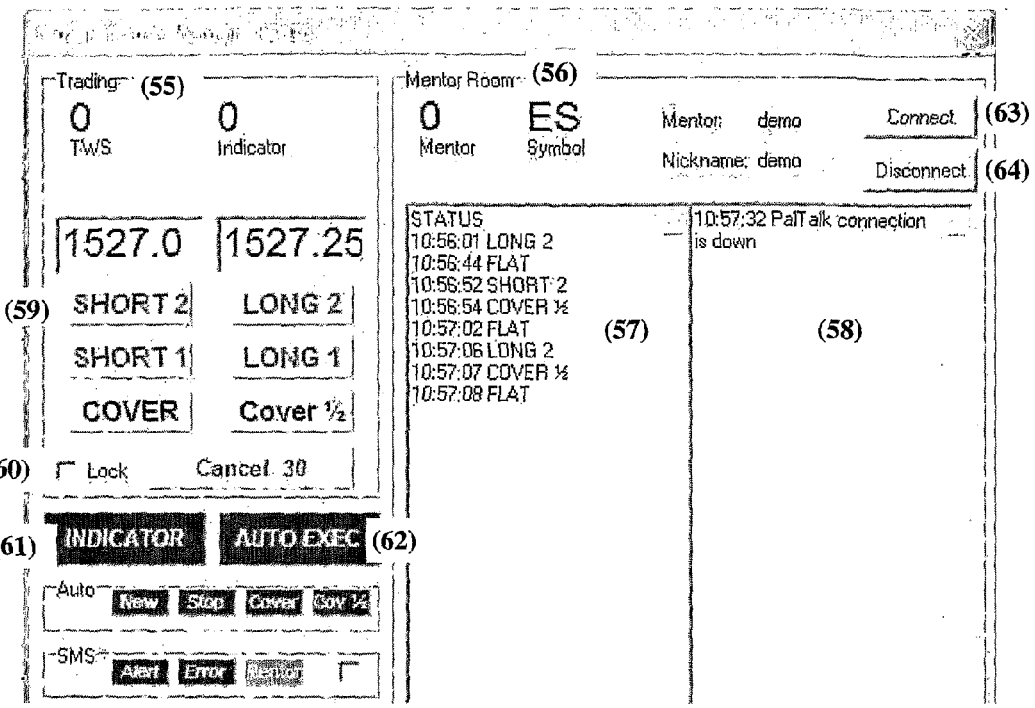
FIG. 11 is an example of a trade panel with support for Mentor trading.

FIG. 11. A trade panel (55) may be used by the user to enter the orders manually. Fixed quantity and functionality may be defined for each button in order to provide the user with a more fast and secure execution method. Short2 (59) may be two units of a symbol, or may be a lot of two units of a Symbol. In case of manually entry of orders, the Trading Panel sends the order to buy or sell to (117). For semi-automatic trading, where suggestions from a Mentor or the Personal Indicator are sent to the user for manual execution, a button (59) on the Trade Panel may be blinking showing the user which trade is suggested and which button to press in order to execute the suggestion. A button "INDICATOR" (61) may be used to activate and deactivate the function of the Personal Indicator. A button "AUTO EXEC" (62) may be used to activate and deactivate the automatic trading. A RadioButton may be used to select the options "market" or "limit" orders. A check box (60) may be used to "lock" the Trade Panel.

A "Mentor Room" section (56) may be added to the Trade Panel (55), for receiving trade calls from Mentors. Trade calls from Mentor Rooms may be separated from Mentor messages and chat messages, using a Memo (57) for listing the incoming trade calls, and a Memo to show the incoming messages and chat messages from the Mentor Room (58). The call may be executed automatically or may start a semi-automatic session, flashing a specific trade button in the Trading Panel (56), and the user may be alerted by a sound alert. Configuration of the Mentor functionality may be set in a configuration window as shown in FIG. 7. The Mentor Panel may also contain a window for visual presentation of charts transmitted by the Mentor Room to the subscriber.

Figure 12:
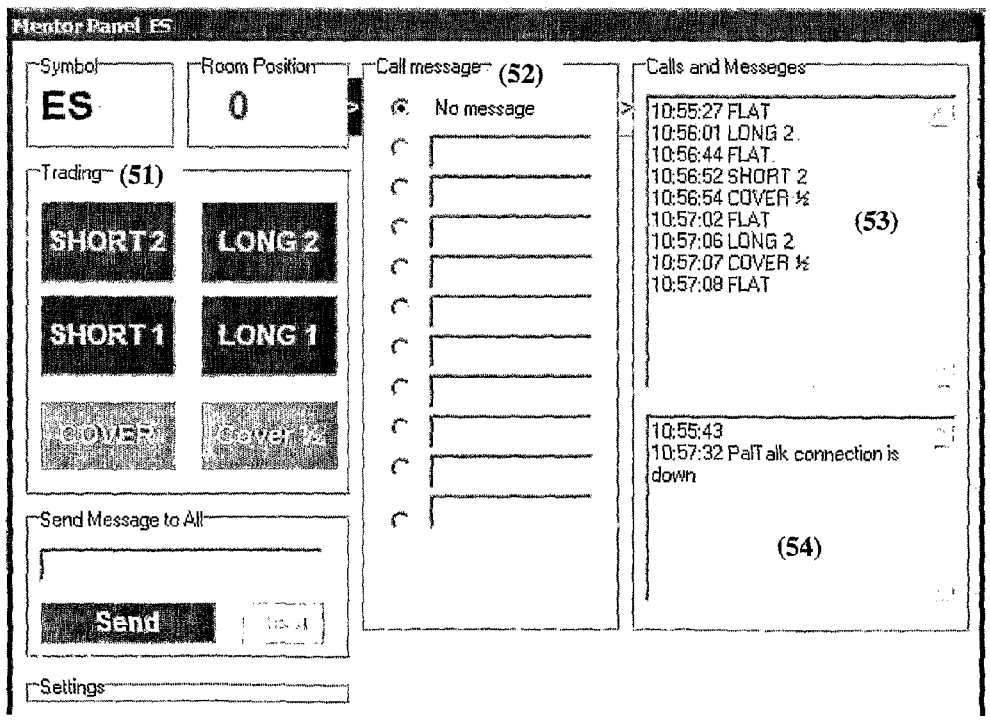
FIG. 12 is an example of a message panel used by a Mentor to send trade suggestions to an ATS.

FIG. 12. The ATS may connect over the internet to a Mentor Room's server. A Mentor Room may then be able to send trade calls and messages to the ATS. The Mentor may use a dedicated Trade Panel as shown in FIG. 12 to send trade calls and messages to the subscribers. Connection may be established by the ATS connects as a client to the Mentor Rooms server. The Mentor may manually send trade calls using a Trading panel (51), or an ATS on the Mentor side may generate the calls automatically and transmit the calls to all clients without or with limited interference from the Mentor. The Mentor panel application may automatically write the corresponding text for the trade call in a Memo (53), and may send both the call code and the call as text to all subscribers. Additional text may be sent along with the call message (52). Text messages may be sent privately to a subscriber or broadcasted to all subscribers connected. The Mentor Panel may have a database or other media with a list of all subscribers allowed connecting to the Mentors server, and checking upon connection whether the client is allowed to connect to the Mentor Room. The Mentor Room may suggest several different Symbols to the subscribers, each Symbol may have its own socket IP address and port number. Trade calls may be separated from chat messages in order to provide the client with a more structured message flow. The mentor panel in FIG. 12 may also contain a window for visual presentation of charts, which may be transmitted to the subscribers.

Figure 13:
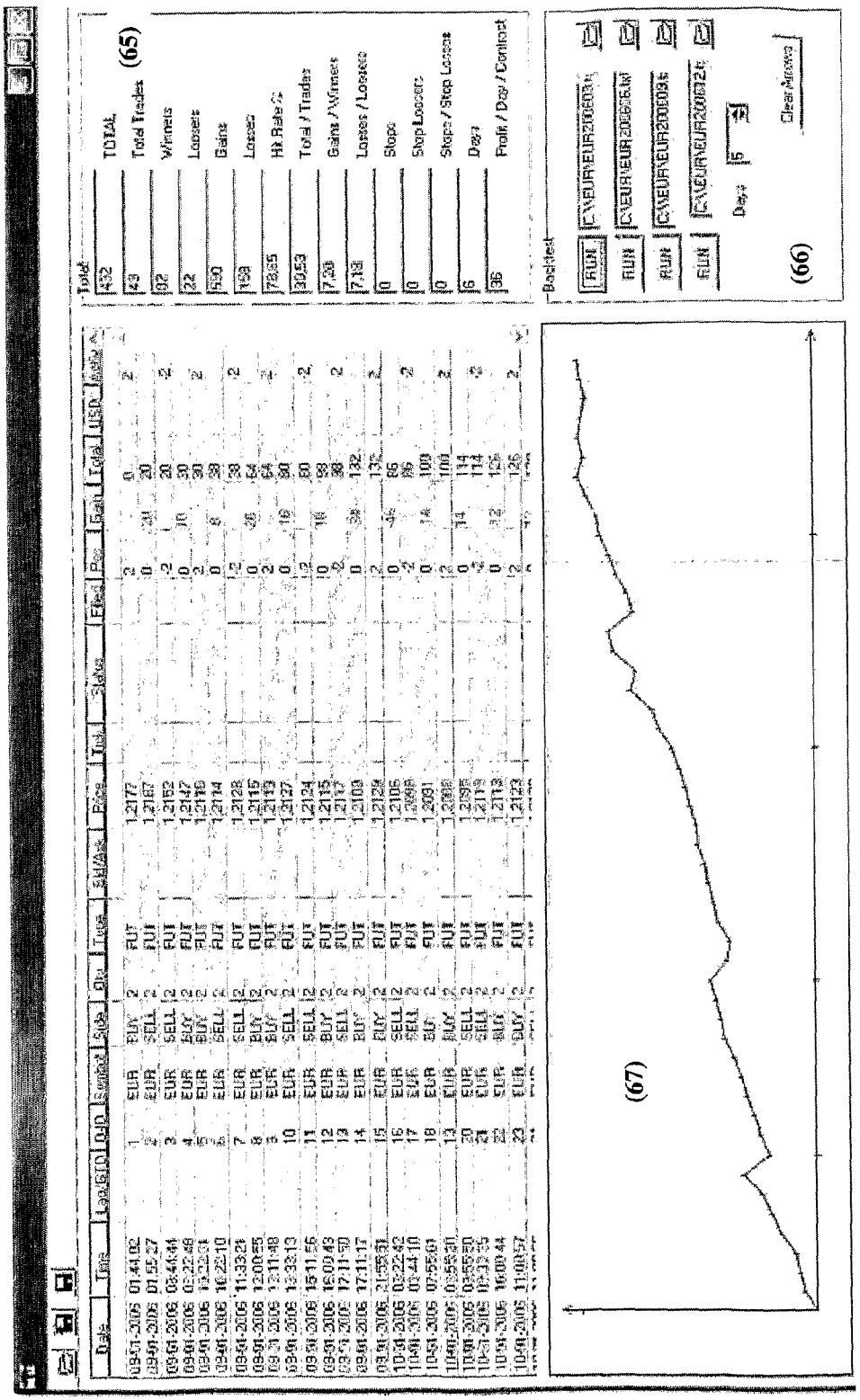
FIG. 13 is an example of a results page showing all trades and an accumulated gain graph.

FIG. 13 shows an example of how the result of a back test using historical data, or a live trading session may be presented to the user. Trades may be listed in a chart including time for the trade, price, gain and other information related to the trade. A group of results for the back test may be available (65), a panel for selection of various sources of historical data may be selected (66), here shown as four files to choose from. The direct selection of which historical data to run, may be an arbitrary number of selections. A performance graph may be used to visualize the performance of the present Personal Indicator tested or traded (67).

Figure 14:
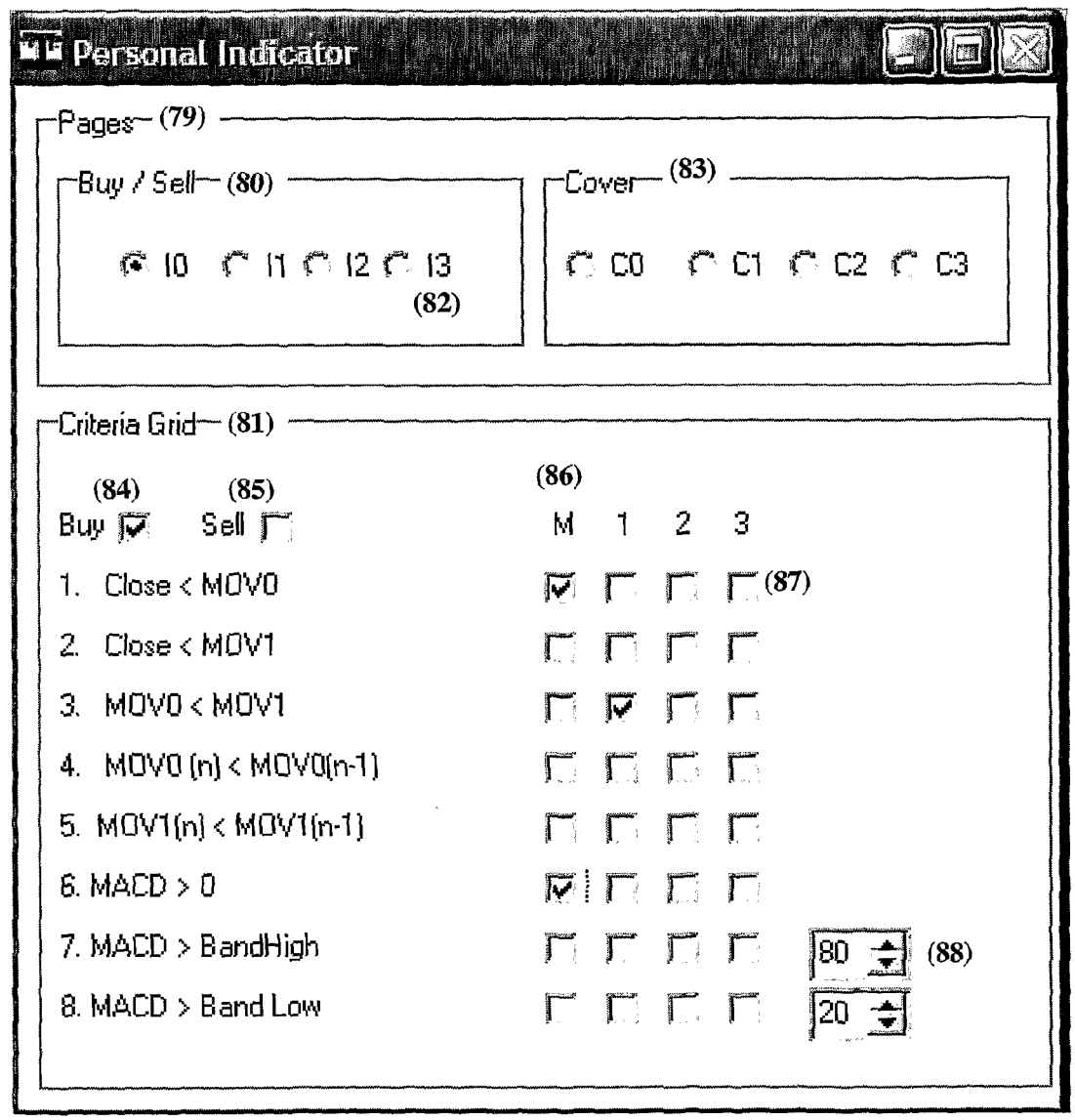
FIG. 14 is an example of a GUI design of multidimensional Criteria Grids and Criteria Pages.

FIG. 14 shows a method of how the user may combine a mix of criteria using computer aided methods. A grid of check boxes (81), "Criteria Grid", may be used to select a mix of criteria here shown with criteria no. 1-8. Multiple charts or Symbols may be included. For each chart or Symbol a column of check boxes may be added (86), forming a two-dimensional grid of check boxes. The example in FIG. 14 show 4 charts, and the corresponding 4 columns of check boxes, one column for each chart, in the shown example column "M" is the first chart, column "1" is the second chart etc. The checking of a mix of check boxes (81) results in a final Personal Indicator used to determine when to buy and sell. The use of multiple check boxes corresponds to a mathematical AND functionality. Other means of selecting a criterion may also be a part of the user interface, such as SpinEdits, ListBoxes, ComboBoxes, AddBoxes/Windows where the user adds a criterion to a box or window. A criterion may be related to calculated technical indicators, a flag which may be set or reset, or other types of criteria. A functionality, which we here will call PAGING, may be added to the graphical interface (79), in such a manner that a mathematical OR is obtained. Each PAGE may be OR'ed with each other. RadioButtons (82) may be used to select the present page to work in. Other methods of selecting a particular page to work in may be used, such as simple buttons and panels. The graphical user interface shown in FIG. 14 may be understood as a new computer aided method to assist the user combining complex criteria into a Personal Indicator, including both AND and OR functionality to the Personal Indicator in ATS systems. The example in FIG. 14 accomplishes the task of selecting a mix of criteria without any programming by the user, thus the method used in FIG. 14 may also be used by users with no or limited programming skills. An unlimited amount of criteria may be added, and graphical tools may be used to order criteria in groups or subpages. However this graphical interface may be combined with the inclusion of programming lines. In this example FIG. 14, one set of check boxes and SpinEdits are used common for all the pages. Each page may also contain its own check boxes and other tools of selecting criteria such as ListBoxes, ComboBoxes add Windows etc. Each page may be dedicated for sell or buy only, or both, by checking check boxes (84) and (85). A criterion may have a double functionality by using a method we here will call INVERTING; all criteria in FIG. 14 are for selling, however if the check box for buying is checked the criteria is automatically inverted by the underlying computer aided process. Thus criteria 1. would have two expressions, in case of selling, criteria no. 1. is "Close<MOVO", and in case of buying criteria no. 1 is "Close>MOVO". By using this inverting method, only one set of each criterion is listed. If this inverting method was not used, the double amount of criteria would be needed to present both sell and buy criteria. This inverting method may also be used for criteria in cover and stop-loss trades. Thus one set of criteria may be used for all type of pages and trades. The pages may be divided in several groups of pages, sell-pages, buy-pages, cover-pages, stop-pages. In FIG. 14 the pages have been divided into two groups, "Buy/Sell" and "Cover". When a check box is checked or unchecked, an underlying data buffer may be updated with the corresponding check box status. An example of the layout of such a criteria buffer may be as the following three dimensional array:

[int PAGE_No] [int CHART-No] [bool Criteria_No], where "Criteria_No" may be true or false.

The later interpretation of this criterion may then depend whether the check box for sell or 325 buy has been checked, and whether sell or buy is allowed in this particular moment.

Figure 15:
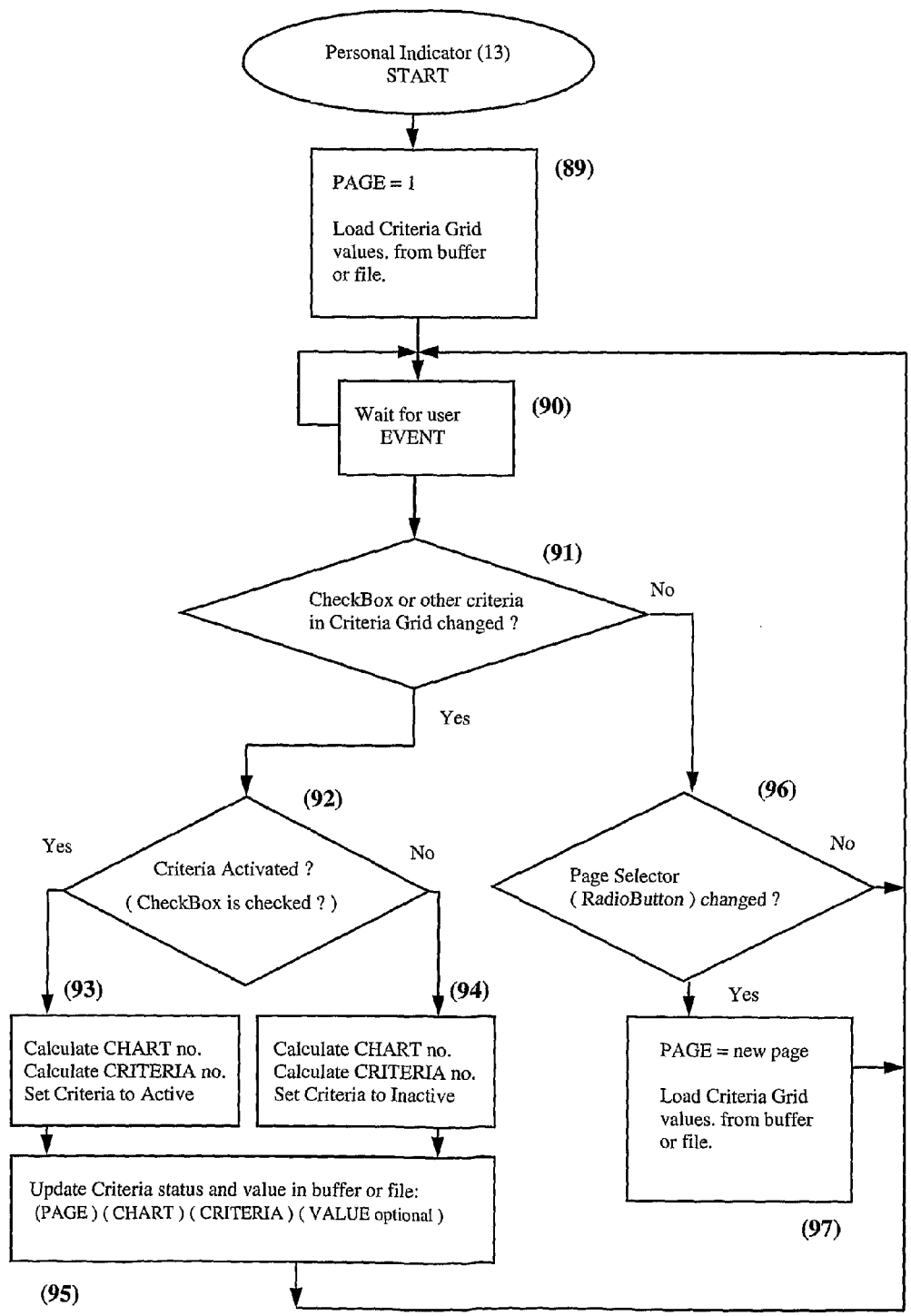
FIG. 15 is an example of a flow chart of Criteria Grid and Pages when a GUI event occurs.

FIG. 14 may be expressed by a flow chart FIG. 15. At start (89) a default PAGE may be set, in this example PAGE is set to the first page 1. When the user selects an item related to FIG. 14, it is investigated which item was selected by the user (91). In case an item in the Criteria Grid was selected, in this example it may be a check box, functionality (92) investigates which kind of item was selected and which action to take, in this case whether the check box is checked or not checked. In case of a check box was checked/unchecked the corresponding CHART and CRITERIA is calculated in (93)/(94) and the value of this selection, which may be a value or true/false value, may be saved in a buffer or in a file on the disk or on a remote system. In case the user selected a PAGE-selecting item (96), in this example a RadioButton, the present PAGE number is updated with the user selected new PAGE to work in (97), which may include that Criteria Grid values are updated with the saved values from a buffer or from a file. Each time the user change the PAGE to work in, the corresponding values for the Criteria Grid Items for this particular PAGE may be loaded from a buffer or from a file.

Criteria may dynamically be added or removed in the Criteria grid by the user. New Criteria Pages may dynamically be added or deleted by the user.

Figure 16:
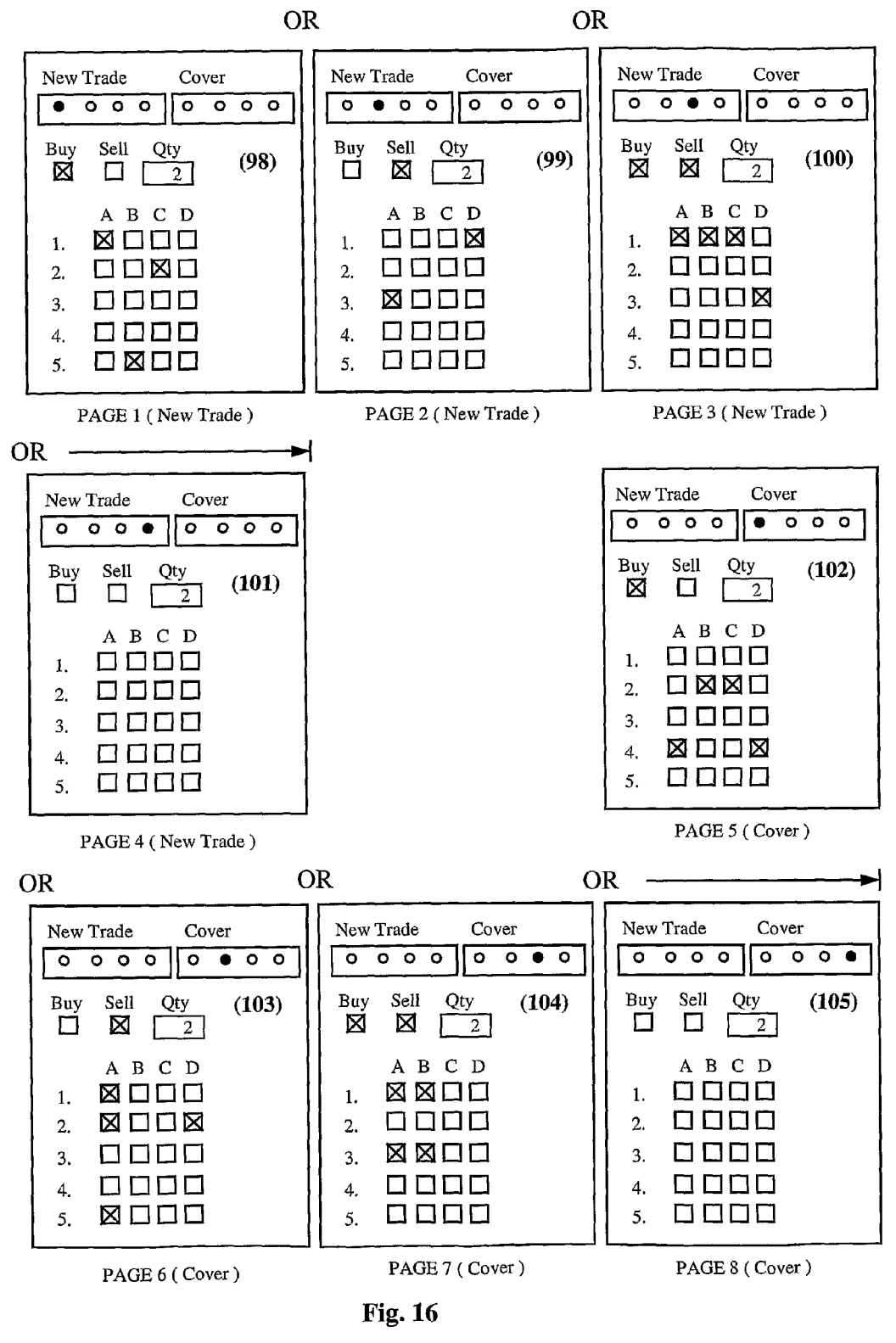

FIG. 16 shows an example of how such a Personal Indicator made from 8 Criteria Pages may look. In this example the Criteria Pages have been divided into two groups, New Trade pages and Cover pages. Page 1 is used for new Buy conditions only, Page 2 is used for new Sell conditions only. Page 3 is used both for new Buy and Sell conditions since the "Buy" and "Sell" check box is set active. Page 4 has no influence since neither "Buy" or "Sell" is activated. All 8 pages may not be visible at the same time, but the user may shift from page to page using the Radio Buttons (82). Page selectors, in this example Radio Buttons, may use color coding to visually indicate the type of trades active for the particular page. Green coding may be used for BUY active only, Red coding may be used for SELL active only, Gray color may be used for both BUY and SELL active in the page. No color may indicate that Criteria Page is not active for BUY or SELL.

Figures 25, 26:
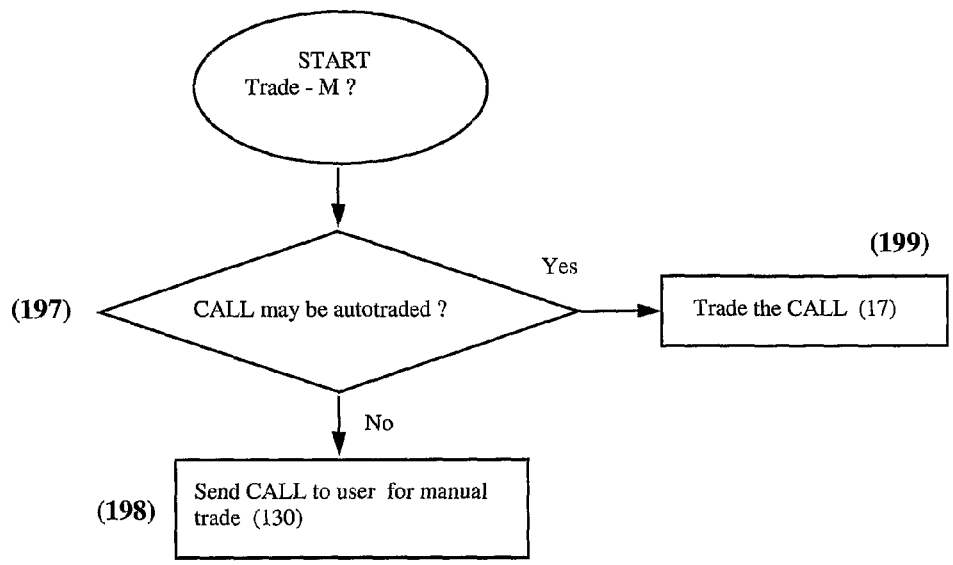
FIG. 25 is an example of a flow chart of how to execute a trade, automatically or semi-automatically.
FIG. 26 is an example of Criteria Pages showing how the invention may be used for partial profit taking.

One or more Criteria Pages may be used for partial profit taking. A Criteria Page may be configured as a cover page, only triggering a cover trade if the present position size is equal to a selected size, and the remaining criteria in the Criteria Page are met. FIG. 26 shows an example of how partial profit taking may be implemented using several Criteria pages. In this example are we using one New Trade Page (200), and two Cover Pages (201) and (202) in order to perform the partial profit taking. Cover Page 5 (201) will cover one unit when position size is 2, and Cover Page 6 (202) will cover the remaining unit when position size is equal to 1 and all selected criteria in the Criteria Page are met. Thus Cover Page 5 will be triggered first, then Cover Page 6.

One or more Criteria Pages may be used for pair trading, for example one Criteria Page may trade Symbol A, and one or more other Criteria Pages must also be met using a different Symbol B in order to trigger a pair trade. One of the Criteria Pages may be inverted in order to obtain a hedge trade of two Symbols. Color coding may be used on each page selector in order to indicate whether the particular Criteria Page is enabled for pair trading. FIG. 27 shows an example of how pair trading may be implemented using the Criteria Grid. New Trade page 1 (203) trades the Symbol IBM, and criterion 6 for pair trading is used to select pair trade and to select the second Criteria Page to use for this pair trade. Criteria Page 2 (204) is used for the second Symbol NQ in the pair trade, a zero in criterion 6 may be used to indicate that the particular Criteria page is a second page in a pair trade and is not active for other purpose. Cover Page 5 (205) is used to cover the pair trade, where criteria no. 6 may be used to indicate a pair trade and criterion no. 10 may be used to indicate that this Cover page is only active for trades initiated by New Trade page 1.

One or more Criteria Pages may be configured for portfolio trading, in such a manner, that a criterion for the present positions size is set to zero, in order for the New Trade page only to trigger a new trade when the present position size is zero and the remaining selected criteria are met, not disturbing other active New Trade pages. Along with this, one or more Cover Pages may be configured for binding with a particular New Trade page, in order to ensure that this Cover page is only active for one particular New Trade page. The above enables the user to develop sophisticated portfolio strategies where several trade and cover strategies are run simultaneously. Such strategies may be difficult or impossible for a developer to overlook and develop using traditional development methods. FIG. 28 shows an example of how a portfolio of algorithms may be implemented using the Criteria Pages. Each of the New Trade pages (206), (207) and (208) have different mix of criteria selected and are thus different algorithms. Criterion no. 7 in the New Trade pages ensures that a trade is only triggered when no other algorithm has been triggered and that a trade position is not open, in order not to disturb the other algorithms. This option may not be used in case it is desirable to interrupt other algorithms. Each of the Cover pages (209), (210) and (211) are bound to a specific New Trade Page by using criterion 10, thus Cover Page 5 is only active for covering trades initiated by New Trade Page 1, Cover Page 6 is only active for covering trades initiated by New Trade page 2, and Cover Page 7 is only active for covering trades initiated by New Trades page 3.

The criteria used in a Criteria Page may include:

The Symbol or Symbols to trade, quantity to trade, whether the Criteria Page is active for buy, whether the Criteria page is active for sell, the hours and days allowed to trade, settings for technical indicators, bar patterns, different profit/loss limits, drop-down lists or edits of criteria values, whether it is allowed to re-enter a trade on the same side, whether the page is used for pair trading, reference to one or more other Criteria Pages, reference in order to link a Cover Page with a New Trade page, values for the present position size, setting of flags instead of triggering a trade, sending an SMS message instead of triggering a trade, custom criteria dynamically added by the user, whether the Criteria Page is used for loop optimizing, trade suggestions from mentors or other external sources.

The radio button page selectors for Criteria Pages may be replaced by any other type of selector such as: Referenced as files in a file system, buttons, dropdown lists, icons, lists of items.

Check boxes activating and deactivating criteria in the Criteria pages may be replaced by any other type of selector with similar functionality.

ATS Real Time Flow

Figure 17:
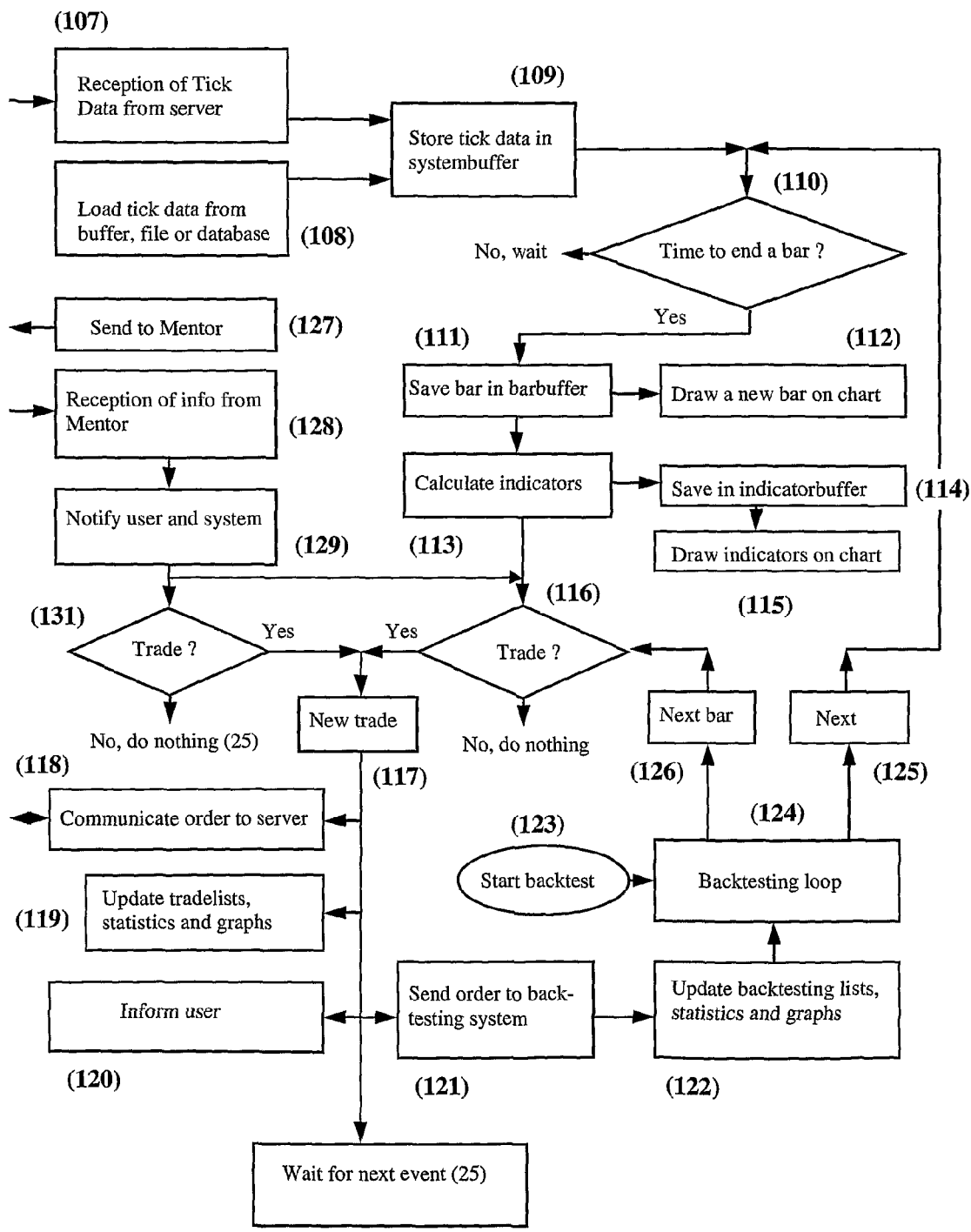
FIG. 17 is an example of a flow chart, showing the flow of a tick event in the ATS.

FIG. 17 shows a flow chart of how the process and flow of a real time ATS may be understood. Tick data, containing bid, ask, last, volume values, from the stockbroker or data provider, enters the ATS in real time tick by tick (107). The tick data may be stored in a buffer at this moment or later in the process. Functionality (110) decides whether a new bar is to be ended. This functionality (110) may have a range of different methods to decide when a bar should be ended, most common are the method of timebars and rangebars. If the functionality (110) does not end a new bar, the ATS will wait for next arrival of tick data at (107). In case the functionality (110) decides to end a bar, charts may be updated with this new bar (112). In case of multiple charts or multiple Symbols the new bar may be updated in all charts. The data of the new bar; time, open, close, high, low, may be saved in a buffer (111) for later use. Further a range of technical indicators may be calculated (113) using the data from the newly ended bar together with all or part of previous ended bars, and the values of the indicators may be saved in data buffers (114) for later use. The indicators calculated in (113) may be drawn on the chart (115). The new bars data and previous bars data, and the new indicator values and their previous values calculated in (113) may be used as input to a functionality (116) which decides or suggest whether it is a good moment to sell or buy. The decision or suggestion made by (116) may be used by a functionality (118) to send an order to the server (1) to buy or sell. The decision or suggestion made by (116) may also be sent to the user using a sound or visual alert (117). Further if a trade has been sent or executed based on (116), the user may be alerted by a sound or visually (117), and statistics, graphs and trading log may be updated with the latest trade (119). After a trade has been sent and executed, the ATS will wait for the next entry of tick data at (25). The ATS may also be used for back testing using historical tick data, using the functionality of (116) to decide when to buy and sell. In case of back testing loop (123), (124), (125), (126), (121), (122), tick data is loaded from a file or database (108). Back testing may be performed on tick data (125) or may reuse bar data from previous loop test (126). The user may also manually inform the ATS to buy or sell. An external source may also send suggestions or decisions to buy or sell, in this example shown as a connection to a Mentor Room (127) and (128), which may forward the suggestion or decision to buy or sell to a functionality (131) which may make the final decision of whether to buy or sell, and send the order to the functionality (118) which will send the order to the server (1). (129) may also forward the suggestion or decision to buy or sell directly to the user by a sound or visual alert. The ATS and the user can also exchange messages with the Mentor (127). The functionality (116) may be disabled, and the user may by visual inspection of the charts decide and manually send the order to buy and sell to the functionality (117). The functionality (116) may be configured in such a way, that a new trade is not sent to (117) directly, but the user is alerted visually or by sound that a suggestion of to buy or sell has been made by (116), the user may then decide whether the trade should be executed.

Combined Bars Method

Figure 18:
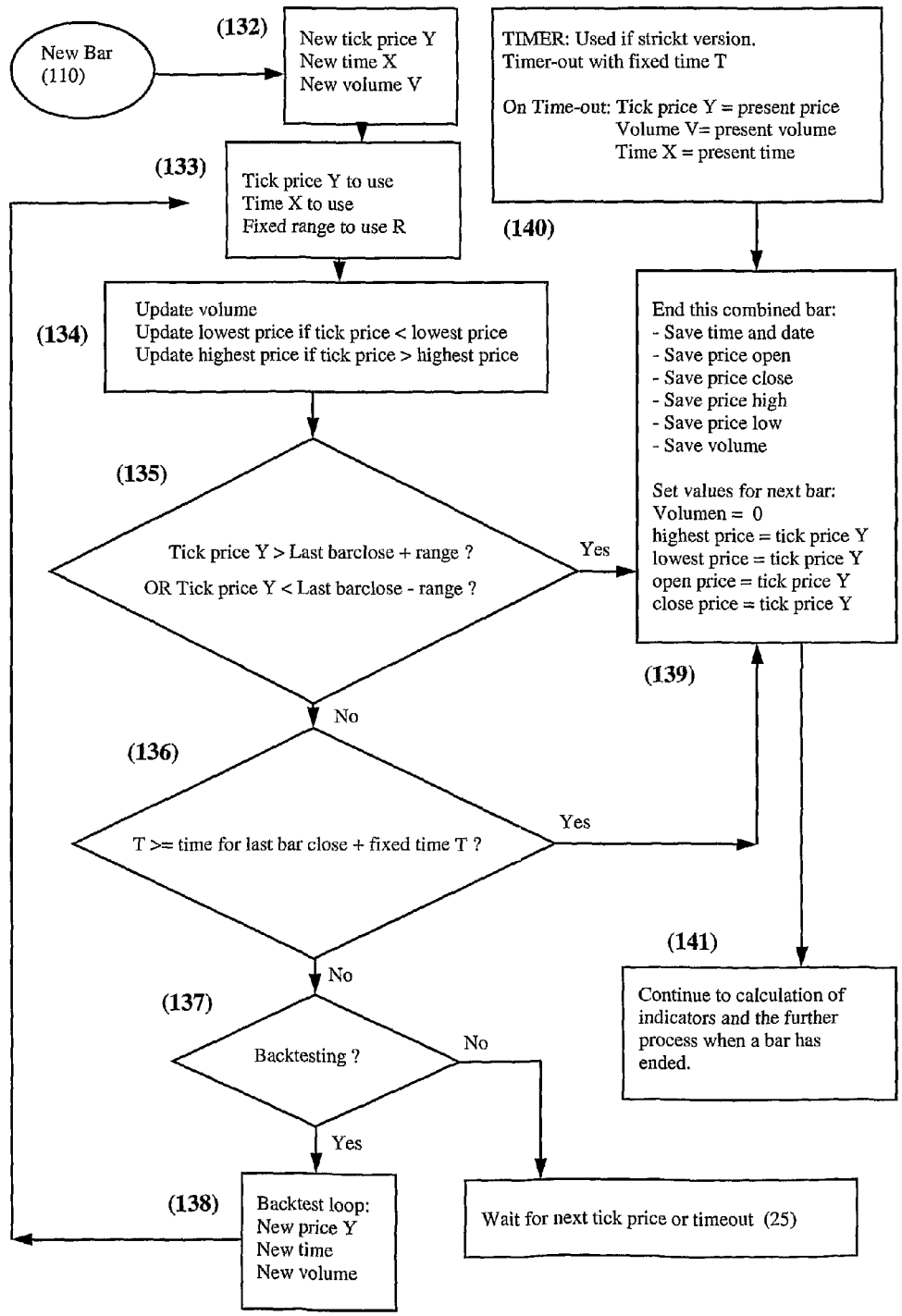
FIG. 18 is an example of a flow chart of how to end a combined bar.

FIG. 18 is a detailed description of the functionality (110), and shows the process of terminating a new type of bar, a Combined Bar. At (132) new tick data may arrive from the server (1), at (133) the tick price, time for the tick and the volume of the tick may be prepared and saved for use in the further process of terminating a new bar. In (134) the volume for the present bar, the highest and lowest price may be updated, highest and lowest value for the bar may be updated. (135) may verify whether the price has moved a sudden value in comparison to the close of the former bar, or in comparison to the present bars opening value. In case the fixed price range has been exceeded, parameters such as open, close, high, low, volume and time for this new bar may be saved for later use (139). In case (135) criteria is not met, (136) may verify whether the time saved in (133) exceeds the fixed time period set for the combined bar. In case the criteria is met, parameters such as open, close, high, low, volume and time for this new combined bar may be saved for later use (139). A combined bar may also be terminated by a time-out of the timer functionality (140), in this case the combined bar is a "stacked" version of a combined bar. In general every time a new combined bar is terminated by either (135), (136) or (140), the values such as open, close, high, low, time and volume may be saved in a buffer for later use (139). (139) may also initiate the start values for the next bar to terminate. After the processing of a new tick data has been ended, the system may wait (25) till next tick data arrives from the server (1). In case of back testing using historical data, new tick data may be fetched from a file, buffer or database and fed to (132), and the loop may continue till all historical data has been used. When a new combined bar has been terminated, the ATS may continue a process using the new Combined Bar. Such process may be drawing the bar on a chart, may be using the bar parameters saved in (139) for calculation of technical indicators (113), or may be used in the process of combining criteria into a Personal Indicator. The ATS may contain a graphical user interface as shown in FIG. 10 to select the parameters Y and T; fixed value of the range, and the fixed time for the combined bar. The lowest time frame, which we here call chart M, may be the final time frame to check for new bar end. It is the termination of a new bar in time frame M which may initiate the further process of trading in the flow chart FIG. 17.

Multi-dimensional Criteria Grid, visual development of algorithms and strategies.

Figure 19:
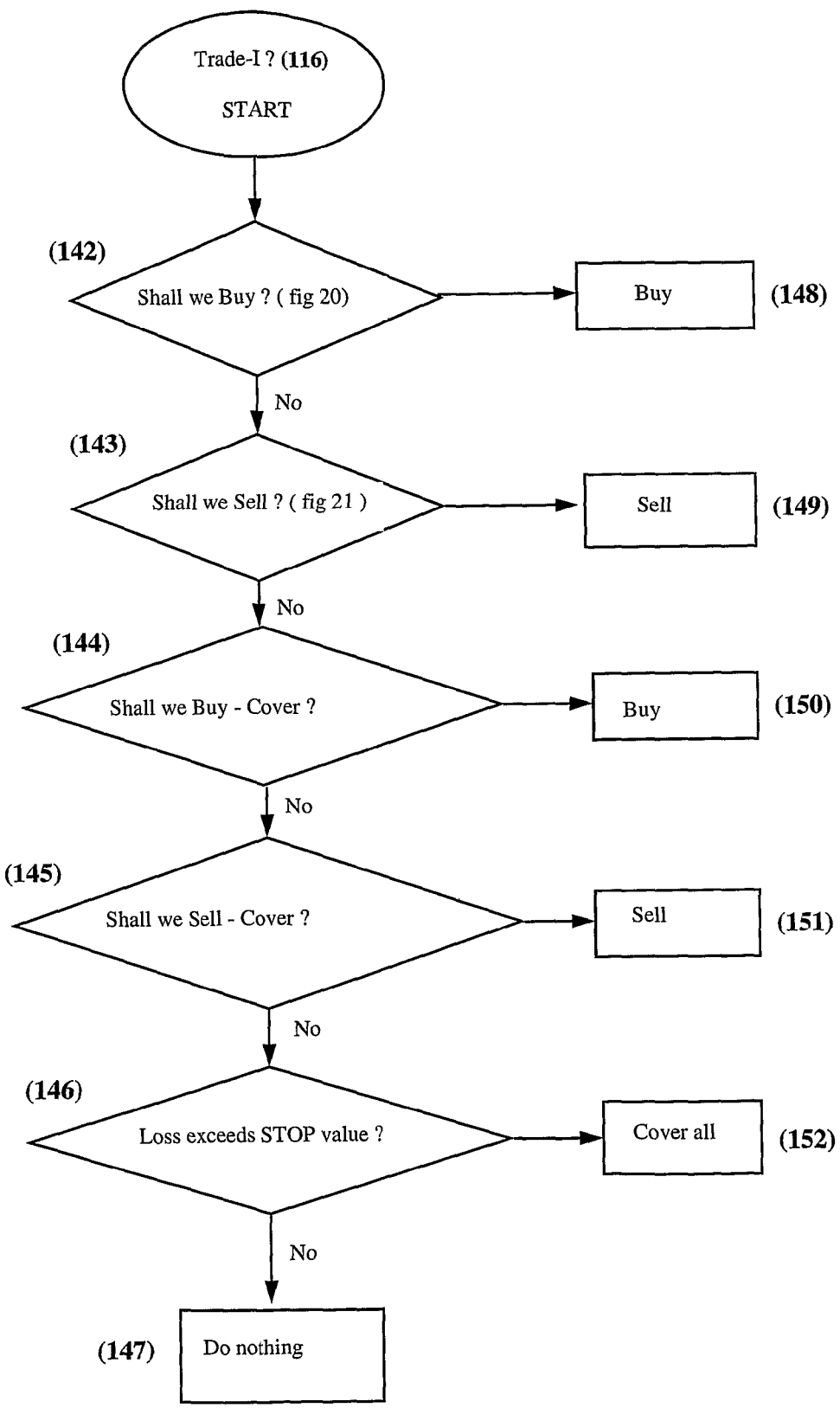
FIG. 19 is an example of a flow chart of whether to trade in an ATS.
Figure 20:
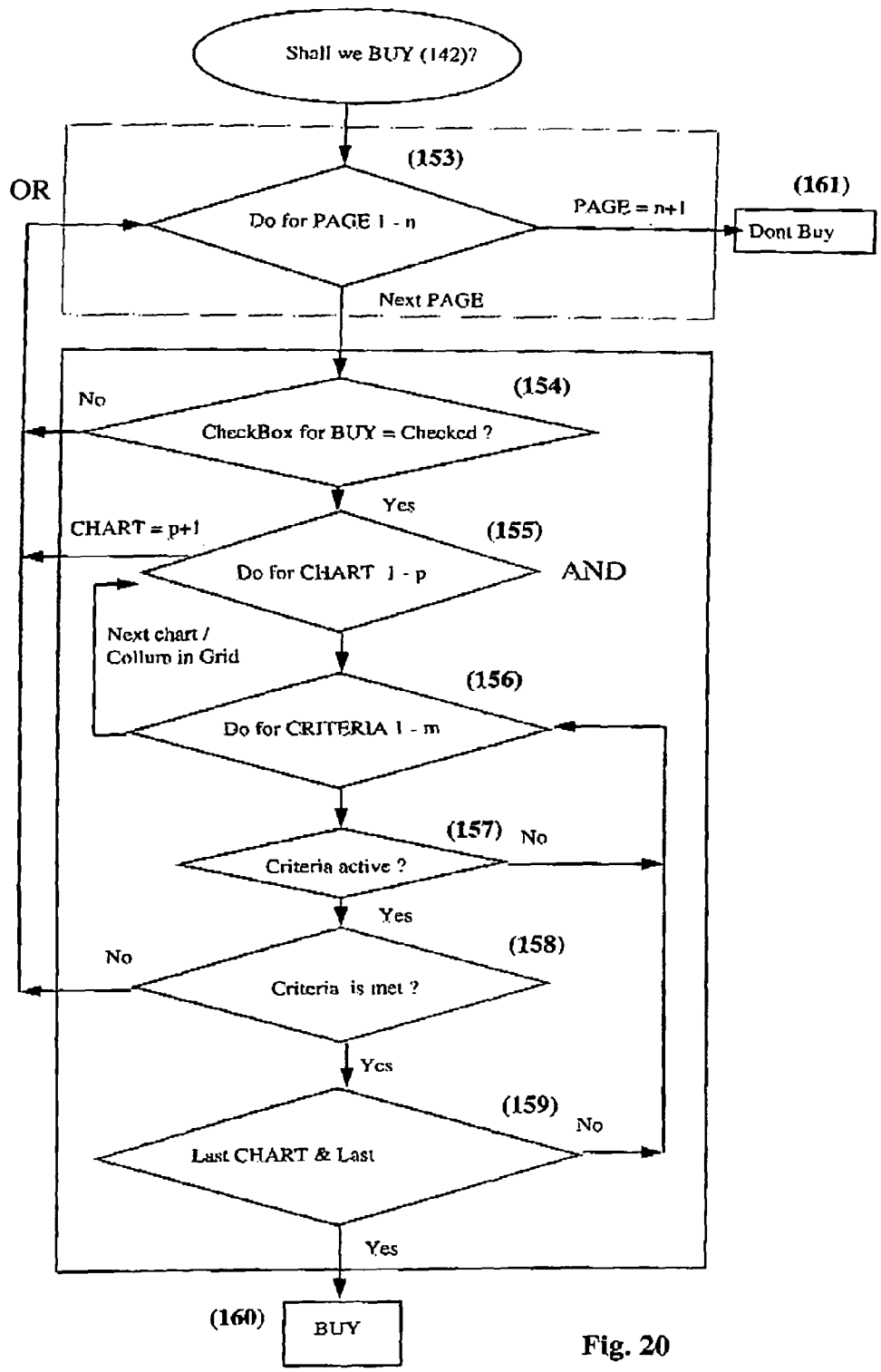
FIG. 20 is an example of a flow chart for a Criteria Page checking the buy side.
Figure 21:
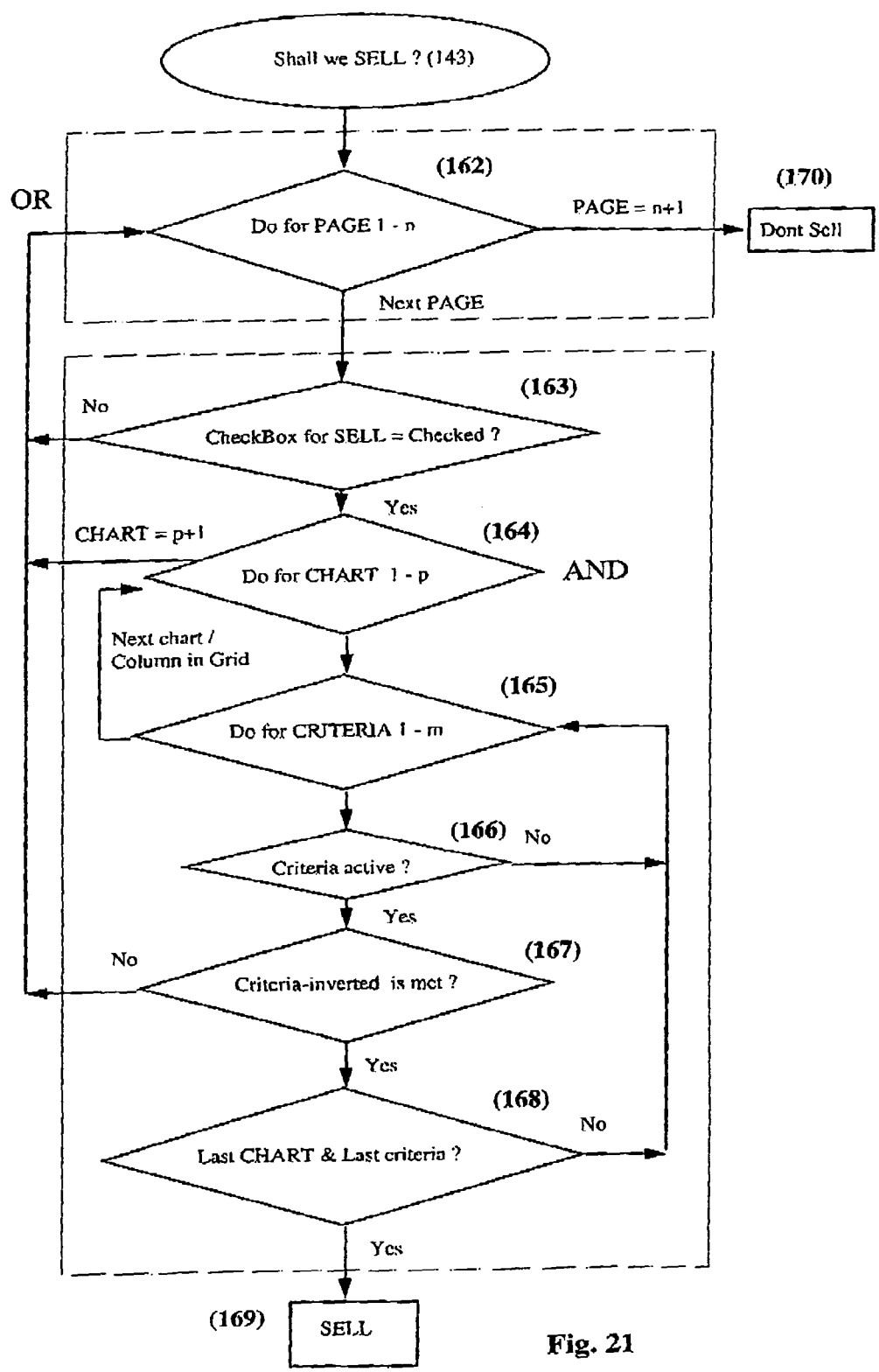
FIG. 21 is an example of a flow chart for a Criteria Page checking the sell side.
Figure 22:
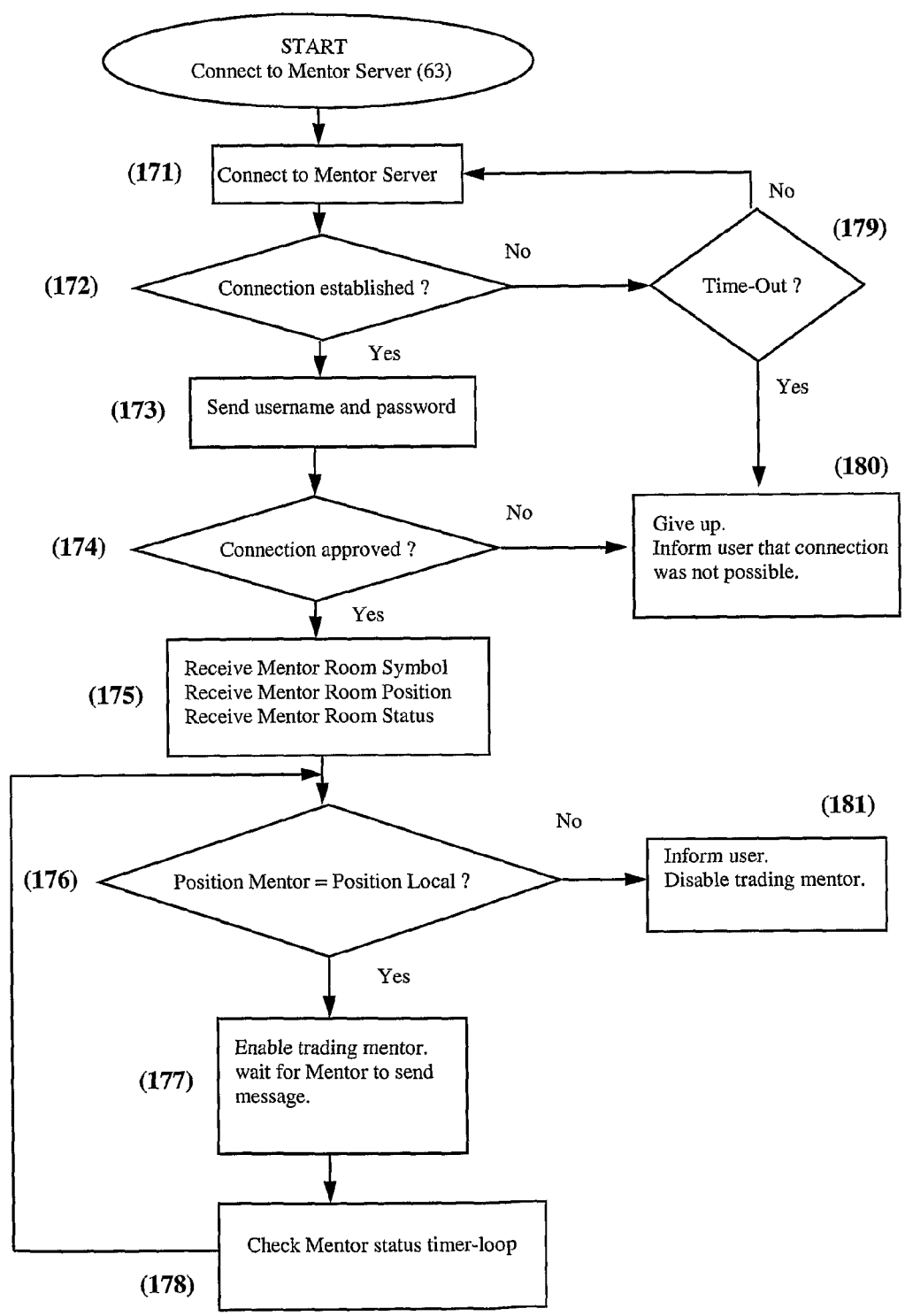
FIG. 22 is an example of a flow chart of how the connection to a Mentor server may be performed.
Figure 23:
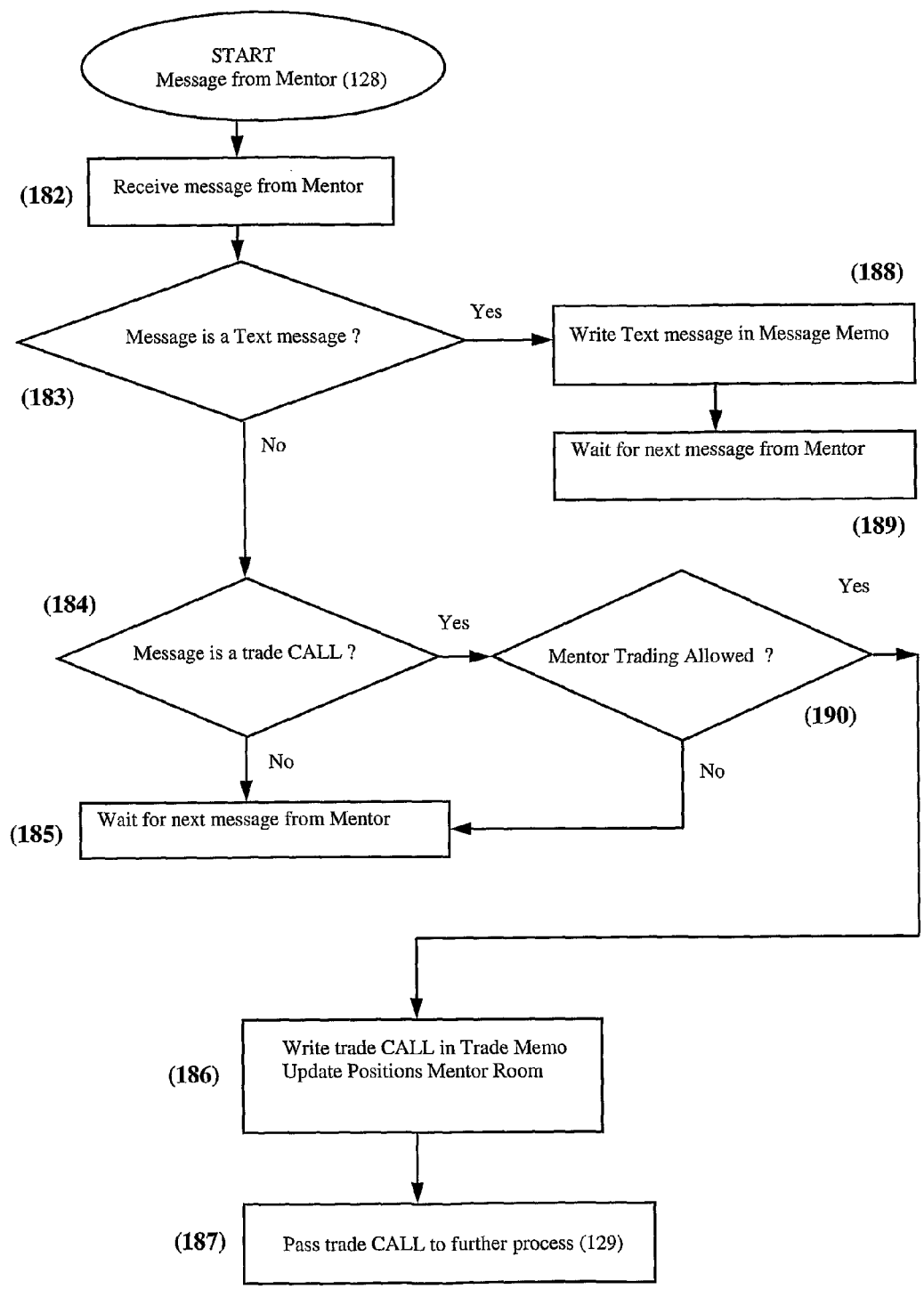
FIG. 23 is an example of a flow chart of how to process a message from a Mentor or external source.
Figure 24:
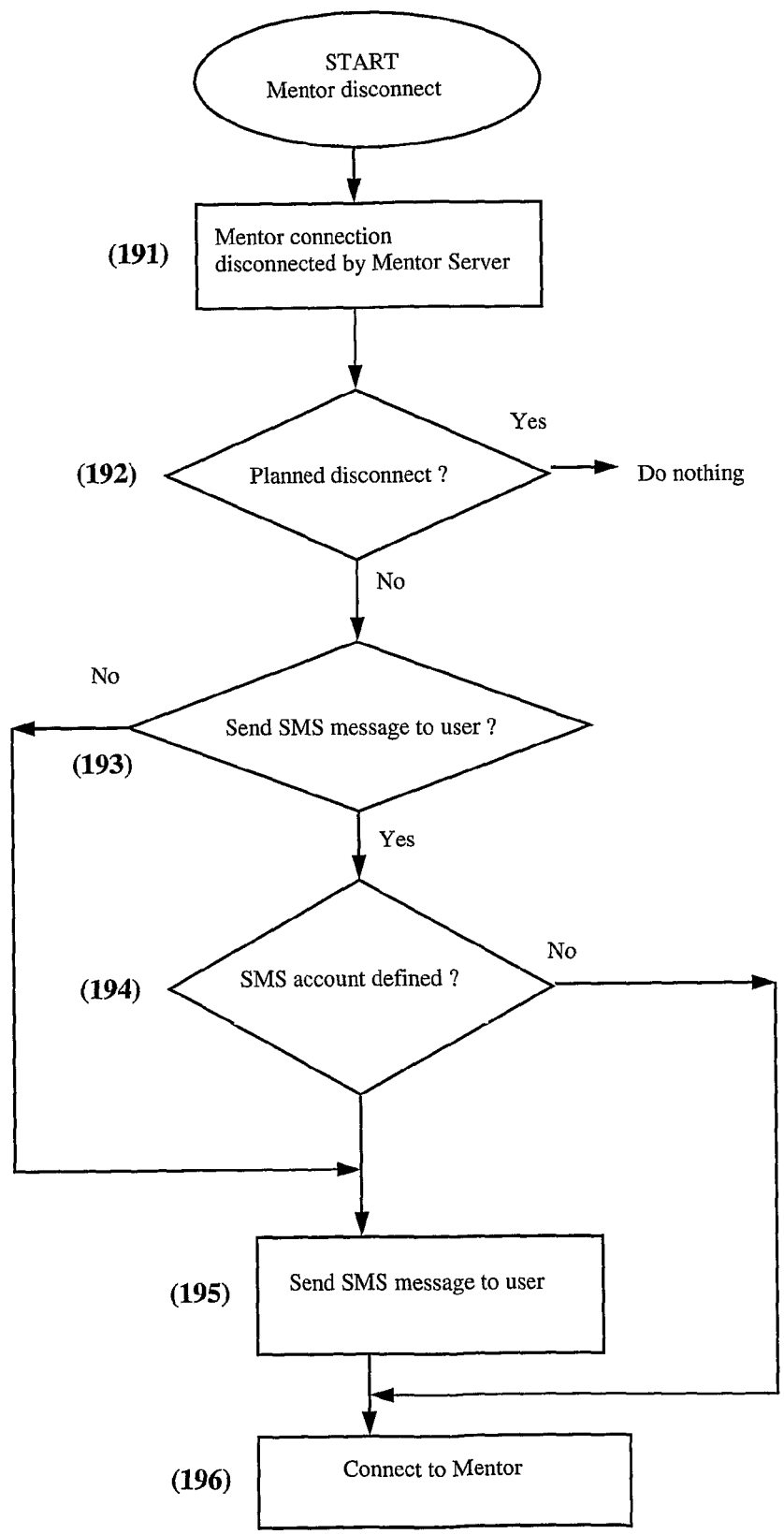
FIG. 24 is an example of a flow chart of how to handle a disconnect from a Mentor or external source.

FIG. 19 is a flow chart of how the functionality (116) may be understood. The underlying buffer of the Personal Indicator, configured in FIG. 14 and FIG. 15 is used to determine whether the criteria are met at this particular moment and price. In case of "Buy" is not allowed on the present page (154), the process will continue to verify the next page, since each page may be seen as an OR functionality. In Case "Buy" is activated (155), (156), (157) and (158) verifies all active items in the Criteria Grid for true, false or value. In case a criterion is not met, the process continues to next page. If all pages have been tested and all active criteria of buying are not met in any page, the ATS do not trade (161) and continues in FIG. 19. If all criteria (159) are met in any page, a trade will be initiated (160). The method of determine whether criteria are met to Sell FIG. 21 is very similar to the method of determine of when to Buy FIG. 20, the major difference is the method of inverting the criteria (167), which is not visible for the user but done automatically by the computer aided functionality. Cover pages for both buying and selling may uses the same method as FIG. 20 and FIG. 21.

A functionality may be added in order to back test using all combinations of the criteria. However, if a high number of rows and columns in the Criteria Grid, the amount of combinations may be billions, and not practical and very time consuming to test. One or more Criteria Grid pages may therefore be dedicated for selecting the criteria which the function will include to back test all combinations of these selected criteria in a loop optimizing of the algorithm.

The invention claimed is:

1. A computer-implemented method for defining and back testing at least one personal indicator based on at least one user selectable timeframe and user selectable criteria, the method comprising:

creating, by a computer, a multidimensional set of timeframes and criteria, wherein one dimension comprises timeframes and one dimension comprises criteria, and wherein at least one timeframe in the timeframes dimension relates to at least one criterion in the criteria dimension;

displaying, by the computer, the multi-dimensional set of timeframes and criteria;

selecting, by a user via the computer, at least one timeframe of a plurality of user selectable timeframes and at least one criterion of a plurality of user selectable criteria for a financial instrument, defining a personal indicator;

receiving, by the computer for at least one selected timeframe at least one set of data for the financial instrument of the timeframe, wherein the set of data includes price data;

receiving or calculating, by the computer, at least one value of a technical indicator;

back testing, by the computer, the personal indicator defined by the multidimensional set of the at least one selected timeframe and the at least one selected criterion, wherein the back testing is based on determining at least one value of at least one selected criterion and selected timeframe, said determining using at least one value from the technical indicator;

storing, by the computer at least one determined value from said back tested personal indicator.

2. The method of claim 1, wherein displaying the multi-dimensional set further comprises displaying a plurality of rows and a plurality of columns.

3. The method of claim 1, wherein displaying the multi-dimensional set further comprises a plurality of selectors for selecting criteria and where a selector may be a CheckBox, a SpinEdit, a ListBox, a ComboBox, or an AddBox/Window where a user adds a criterion to a box or window.

4. The method of claim 1, wherein displaying the multi-dimensional set further comprises that a user can add or remove a criterion or timeframe.

5. The method of claim 1, further receiving notification when a user has added or changed a timeframe or criteria in the displayed multi-dimensional set of timeframes and criteria.

6. The method of claim 1 wherein the criteria are further ordered based on criteria into groups or subpages.

7. The method of claim 1 wherein displaying the multi-dimensional set comprises a minimum of two timeframes from different financial instruments.

8. The method of claim 1 wherein the multi-dimensional set is based on criterion in the form of at least one programming line.

9. The method of claim 1, wherein displaying the multi-dimensional set comprises a criterion derived from a trade suggestion received from a mentor-trader.

10. The method of claim 1 in the step of back testing, wherein the value of a criterion at each time value has the value of true or false.

11. The method of claim 1, wherein the criteria in the dimension of criteria comprise both a buy-side and a sell-side version of the criteria, wherein the step of back testing uses the buy-side version of the criterion for determining the value of said criterion for buy-indications, and wherein the method uses the sell-side version of the criterion for determining the value of said criterion for sell-indications.

12. The method of claim 10, wherein a trade-indication is generated at a time value when all selected criteria are true at the time value.

13. The method of claim 12, wherein the trade-indications are used for automated order execution trading a financial instrument, wherein the trade-indication is either a sell-indication or a buy-indication.

14. The method of claim 1, wherein displaying the multi-dimensional set only displays a buy-side or a sell-side of the criteria in the dimension of criteria.

15. The method of claim 1, further comprising a plurality of criteria pages, wherein each criteria page comprises a multi-dimensional set of timeframes of financial instruments and criteria related to technical indicators.

16. The method of claim 15, wherein at least one of the plurality of criteria pages is defined to: a) use sell trade-indications; b) use buy trade-indications; c) use both sell and buy trade-indications; d) defines new trade-indications; or e) defines exit trade-indications.

17. The method of claim 15, wherein the back testing comprises back testing of the plurality of criteria pages.

18. The method of claim 15, wherein at least one of the plurality of criteria pages is used for optimizing the personal indicator, wherein optimizing includes back testing all the combinations of the selected criteria in the at least one of the plurality of criteria pages.

19. The method of claim 1, wherein the creation of the multidimensional set of timeframes and criteria comprise a pre-selected criterion related to a pre-selected timeframe, defining the personal indicator.

20. The method of claim 1, wherein the receiving or calculating of a value from at least one technical indictor is performed during back testing.

* * * * *